(12) United States Patent
Cuenot et al.

(10) Patent No.: US 12,281,934 B2
(45) Date of Patent: Apr. 22, 2025

(54) OPTICAL FIBER-BASED SENSING MEMBRANE LAYOUT

(71) Applicant: VIAVI SOLUTIONS INC., Chandler, AZ (US)

(72) Inventors: Benjamin Cuenot, Saint-Priest-en-jarez (FR); Pascal Donzel, La Talaudière (FR); Vincent Lecoeuche, Tarentaise (FR); Andre Champavere, Saint-Bonnet les Oules (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/671,384

(22) Filed: May 22, 2024

(65) Prior Publication Data

US 2024/0310207 A1    Sep. 19, 2024

Related U.S. Application Data

(63) Continuation of application No. 17/718,377, filed on Apr. 12, 2022, now Pat. No. 12,092,515.

(30) Foreign Application Priority Data

Apr. 16, 2021  (EP) .................................... 21305505
Apr. 16, 2021  (EP) .................................... 21305506

(51) Int. Cl.
*G01H 9/00*    (2006.01)
*B60L 58/18*   (2019.01)
(Continued)

(52) U.S. Cl.
CPC .............. *G01H 9/004* (2013.01); *B60L 58/18* (2019.02); *G01D 21/02* (2013.01); *G01K 11/32* (2013.01);
(Continued)

(58) Field of Classification Search
CPC ......... G01H 9/004; B60L 58/18; B60L 50/64; B60L 50/66; B60L 2240/545;
(Continued)

(56) References Cited

U.S. PATENT DOCUMENTS

2004/0201361 A1    10/2004   Koh et al.
2009/0115607 A1     5/2009   Beinhocker
(Continued)

FOREIGN PATENT DOCUMENTS

CN        1839301 A     9/2006
CN      101750057 A     6/2010
(Continued)

OTHER PUBLICATIONS

Bel, "Fiber Flex Optical Circuits", STRATOS Optical Technologies, downloaded from the Internet on May 27, 2022, 3 pages.
(Continued)

*Primary Examiner* — John Bedtelyon
(74) *Attorney, Agent, or Firm* — Mannava & Kang, P.C.

(57) ABSTRACT

An optical fiber-based sensing membrane includes at least one optical fiber and a substrate. The at least one optical fiber is integrated in the substrate. The optical fiber-based sensing membrane includes, based on a specified geometric pattern of the at least one optical fiber, an optical fiber-based sensing membrane layout. The substrate includes a thickness and a material property that are specified to ascertain, via the at least one optical fiber and based on the optical fiber-based sensing membrane layout, a thermal property or a mechanical property associated with a device, or a radiation level associated with a device environment.

20 Claims, 22 Drawing Sheets

(51) Int. Cl.
| | |
|---|---|
| *G01D 21/02* | (2006.01) |
| *G01K 11/32* | (2021.01) |
| *G01K 11/3206* | (2021.01) |
| *G01K 11/322* | (2021.01) |
| *G01K 11/324* | (2021.01) |
| *G01K 15/00* | (2006.01) |
| *G01L 1/24* | (2006.01) |
| *G01L 25/00* | (2006.01) |
| *G02B 6/12* | (2006.01) |
| *G02B 6/13* | (2006.01) |

(52) U.S. Cl.
CPC ........ *G01K 11/3206* (2013.01); *G01K 11/322* (2021.01); *G01K 11/324* (2021.01); *G01K 15/005* (2013.01); *G01L 1/243* (2013.01); *G02B 6/13* (2013.01); *G01L 25/00* (2013.01); *G02B 2006/12138* (2013.01)

(58) Field of Classification Search
CPC ................ B60L 2250/10; G01D 21/02; G01D 5/35364; G01D 5/35377; G01D 5/35374; G01D 5/35361; G01K 11/32; G01K 11/3206; G01K 11/322; G01K 11/324; G01K 15/005; G01K 2205/00; G01K 1/14; G01L 1/243; G01L 25/00; G01L 1/242; G02B 6/13; G02B 2006/12138; Y02E 60/10; H01M 2220/20; H01M 10/48; H01M 10/486; G01M 11/086; G01B 11/18

See application file for complete search history.

(56) References Cited

U.S. PATENT DOCUMENTS

| | | | |
|---|---|---|---|
| 2014/0203783 A1 | 7/2014 | Kiesel et al. | |
| 2017/0011667 A1* | 1/2017 | Sanchez | A61J 1/03 |
| 2017/0033414 A1 | 2/2017 | Ganguli et al. | |
| 2017/0129361 A1 | 5/2017 | Scaringe | |
| 2017/0248462 A1 | 8/2017 | Farhadiroushan et al. | |
| 2018/0321325 A1 | 11/2018 | Fortier et al. | |
| 2018/0364115 A1 | 12/2018 | Brown et al. | |
| 2019/0006157 A1 | 1/2019 | O'Banion et al. | |
| 2019/0100105 A1 | 4/2019 | Liu et al. | |
| 2021/0031650 A1 | 2/2021 | Reeves | |
| 2022/0311060 A1 | 9/2022 | Wang et al. | |
| 2022/0332217 A1 | 10/2022 | Khaykin et al. | |
| 2024/0310208 A1 | 9/2024 | Graves et al. | |

FOREIGN PATENT DOCUMENTS

| | | |
|---|---|---|
| CN | 102292622 A | 12/2011 |
| CN | 107817286 A | 3/2018 |
| CN | 108718534 A | 10/2018 |
| CN | 108749607 A | 11/2018 |
| CN | 109457902 A | 3/2019 |
| CN | 110633486 A | 12/2019 |
| CN | 111102934 B | 3/2021 |
| EP | 2187472 A2 | 5/2010 |
| EP | 2672234 A1 | 12/2013 |
| EP | 2928006 A1 | 10/2015 |
| EP | 2975366 A1 | 1/2016 |
| EP | 2978043 A1 | 1/2016 |
| WO | 2017040525 A1 | 3/2017 |

OTHER PUBLICATIONS

Bosboom et al., "Ribbon Tapes, Shape Sensors, and Hardware", Conference Paper- Sep. 2015, Conference: Smart Intelligent Aircraft Structures (SARISTU): Proceedings of the Final Project ConferenceAt: pp. 349-406vol. Part IV.

Ferreira da Silva et al., "Development of Skin-Foils With Embedded Optical Fiber Sensors", Semana de Engenharia 2010, 8 pages.

General Wire Products, INC., "Comparison Chart of Typical Insulation Materials", downloaded on the Internet on May 27, 2022, 6 pages.

Han et al., "Multi-Scale Low-Entropy Method for Optimizing the Processing Parameters during Automated Fiber Placement", Materials 2017, 10, 1024, Sep. 3, 2017, 18 pages.

Long et al., "Stability of amorphous-Silicon TFTs deposited on clear plastic substrates at 25° C to 28° C", Article in IEEE Electron Device Letters, vol. 27, NP. 2, Feb. 2006, pp. 111-113.

TE connectivity, "High Density Versatile Optical Flex Circuit Cable Assemblies", downloaded on the Internet on May 7, 27, 2022, 2 pages.

* cited by examiner

OPTICAL FIBER-BASED SENSING MEMBRANE LAYOUT

PRIORITY

This application is a Continuation of commonly assigned and co-pending U.S. patent application Ser. No. 17/718,377, filed Apr. 12, 2022, which claims priority to European Patent Application No. EP21305505.6, filed Apr. 16, 2021, titled "OPTICAL FIBER-BASED SENSING MEMBRANE LAYOUT", and European Patent Application No. EP21305506.4, filed Apr. 16, 2021, titled "OPTICAL FIBER-BASED SENSING MEMBRANE", the disclosures of which are hereby incorporated by reference in their entireties.

BACKGROUND

Optical fibers may be utilized in various industries such as communications, medical, military, broadcast, etc., to transmit data and for other related applications. Examples of applications may include sensing of temperature, mechanical strain, vibrations, and/or radiation dosage by utilizing an optical fiber. In this regard, principles of Raman, Rayleigh, and/or Brillouin scattering may be implemented for sensing of the temperature, mechanical strain, vibrations, and/or radiation dosage.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
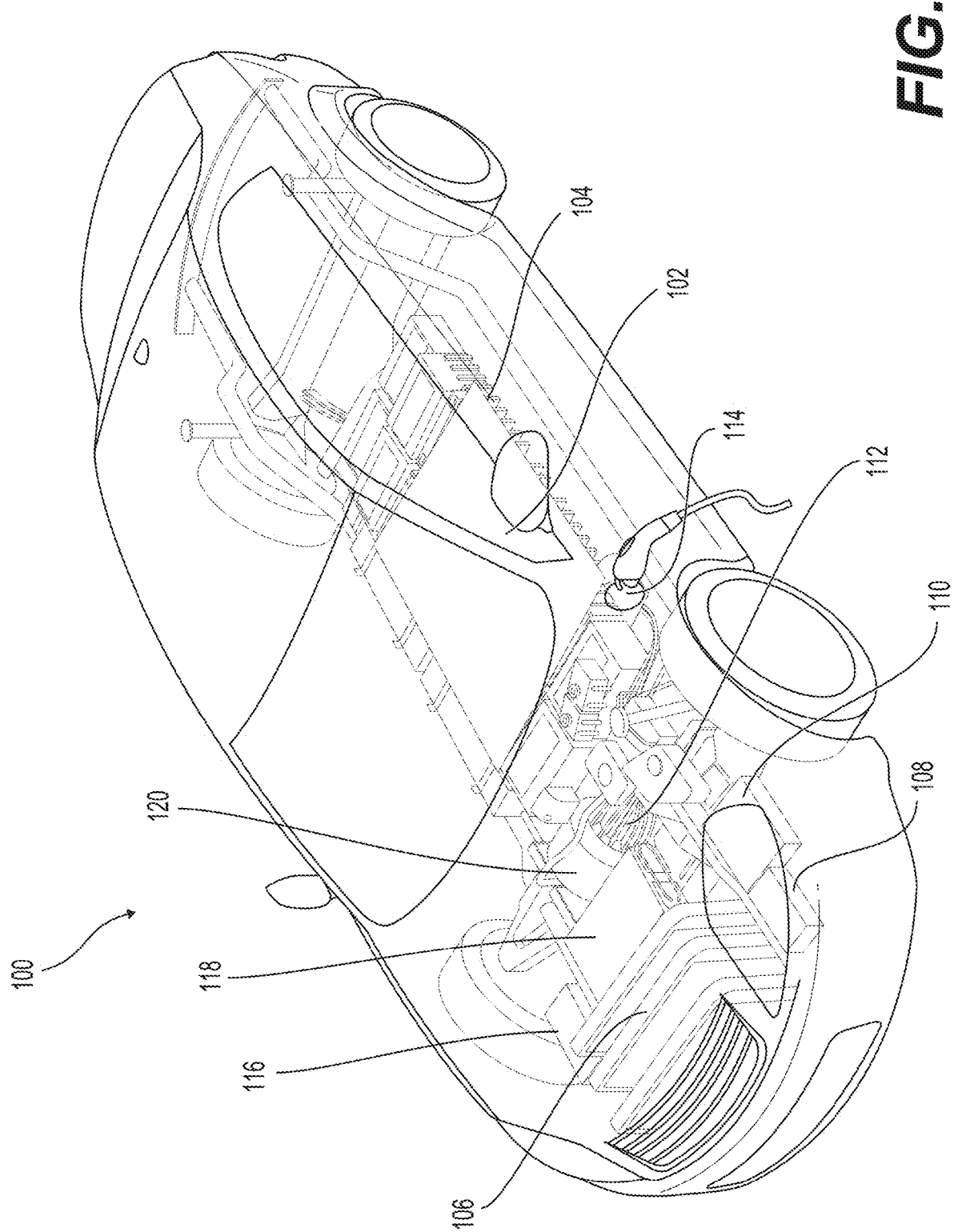
FIG. 1 illustrates an electric vehicle including an optical fiber-based sensing membrane, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples disclosed herein, an optical fiber-based sensing membrane may include at least one optical fiber, and a flexible substrate. The at least one optical fiber may be integrated in the flexible substrate. The optical fiber-based sensing membrane may include, based on a specified geometric pattern of the at least one optical fiber, an optical fiber-based sensing membrane layout. The flexible substrate may include a thickness and a material property that are specified to ascertain, via the at least one optical fiber and based on the optical fiber-based sensing membrane layout, a thermal and/or a mechanical property associated with a device. Examples of mechanical properties may include strain, vibration, and other such properties. The device may include, for example, a battery pack of an electric vehicle, or any other type of flat or curved structure that is to be monitored. Applications may include and not be limited to the monitoring of an energy storage plant based on batteries, monitoring of a nuclear power plant, and monitoring of defense equipment. Yet further, the substrate may be flexible or rigid. For example, with respect to a surface application of the sensing membrane on a device or an embedded application of the sensing membrane in a device, the optical fiber may be embedded in a rigid sensing membrane formed of a rigid substrate. According to another example, with respect to an optical fiber integrated in a molded part of a device such as a battery pack, the optical fiber may be embedded in a rigid sensing membrane formed of a rigid substrate.

With respect to fiber sensing generally, in some applications, an optical fiber may be utilized to monitor thermal and/or mechanical properties of a device. The device as utilized herein may be any type of machine, component, structure, etc., that is to be monitored. For example, for a device such as an electric vehicle battery pack that includes a plurality of battery cells, an optical fiber may be utilized to monitor thermal and/or mechanical properties of the battery pack. In this regard, embedding of an optical fiber directly into the device may not be feasible due to technical challenges related, for example, to laying, coiling, and/or attaching optical connectors each time an independent element (e.g., battery cell of the battery pack) of the device needs to be addressed.

In order to address at least the aforementioned technical challenges, the optical fiber-based sensing membrane disclosed herein may include at least one optical fiber integrated in a flexible substrate, and include, based on a specified geometric pattern of the at least one optical fiber, an optical fiber-based sensing membrane layout. According to examples disclosed herein, the optical fiber-based sensing membrane may utilize, for example, a Polyimide flex, or other such materials. In this regard, the optical fiber-based sensing membrane may also house components such as electrical tracks, sensors, and optical connectors to reduce an electrical harness associated with utilization of the optical fiber-based sensing membrane.

According to examples disclosed herein, the optical fiber-based sensing membrane layout may include various types of layouts. For example, the layouts may include single or multiple optical fibers, single-end or dual-end access to the optical fibers, a coil with multiple layers, sliding loops, an optical fiber-based sensing membrane embedded in a battery cell insert, loops in series, an optical fiber embedded in battery molded parts, and other types of layouts.

According to examples disclosed herein, the optical fiber-based sensing membrane layout may include fiber loops to compensate for spatial resolution. Alternatively or additionally, the optical fiber-based sensing membrane layout may include path folding or partial path folding to compensate for optical fiber losses. A complete and perfect path folding may be achieved, for example, with a multicore fiber and a loopback optical element connecting the two cores in series at a distal end from an interrogator. The path folding technique may provide for the use of a Raman distributed temperature sensor that is single-ended, uses a single-source, and Anti-Stokes power information. This optical-engine configuration may utilize one laser, one photodiode and a three port multiplexer. This optical configuration may distinguish changes of losses from temperature based on implementation of the path-folding technique.

According to examples disclosed herein, the optical fiber-based sensing membrane may sense various types of parameters associated with a device. For example, the parameters may include temperature, strain, vibration, radiation dosage and other such parameters.

According to examples disclosed herein, different types of parameters sensed by the optical fiber-based sensing membrane may be used to generate different types of notifications or alarms. For example, a temperature variation that exceeds a specified temperature threshold may be used to generate a first type of notification or alarm. Similarly, a strain variation that exceeds a specified strain threshold (e.g., due to damage to the device) may be used to generate a second type of notification or alarm. The occurrence of so-called thermal runaway of a battery element may also be classified through the analysis of the temporal evolution and in particular the rate of change of temperature or strain.

According to examples disclosed herein, a number of elements of the device being monitored may be scaled without the need to add optical connections. For example, a length or configuration of the optical fiber-based sensing membrane may be modified as needed to account for an increased or a decreased number of elements being monitored. In this regard, one or more optical connections may be utilized for an optical fiber-based sensing membrane, and a size of the optical fiber-based sensing membrane may be increased or decreased as needed to address a plurality of devices, without the need to include an optical connection for each device. Thus a single optical connection may be implemented for a plurality of devices being monitored, thus reducing the potential of a fault associated with operation of the optical fiber-based sensing membrane.

According to examples disclosed herein, the devices that are being monitored may remain accessible, for example, for maintenance and other such activities, without being restricted by optics associated with the optical fiber-based sensing membrane. For example, the optical fiber-based sensing membrane may be configured to address a specified area of the device being monitored, leaving other areas of the device accessible for maintenance and other activities.

According to examples disclosed herein, the optical fiber-based sensing membrane may itself remain accessible, for example, for maintenance and other such activities. In this regard, the optical fiber-based sensing membrane may be configured to address a specified area of the device being monitored, leaving other areas of the optical fiber-based sensing membrane accessible for maintenance and other activities.

According to examples disclosed herein, the optical fiber-based sensing membrane may be implemented in a relatively harsh environment. For example, the environment of the optical fiber-based sensing membrane may include relatively significant temperature variations on the order of −40° C. to 140° C. The material used for the optical fiber-based sensing membrane may supersede a standard coating of optical fibers and continue to protect the optical fiber mechanically beyond the melting point of coating.

According to examples disclosed herein, the optical fiber-based sensing membrane layout may include a two-dimensional or a three-dimensional configuration. The two-dimensional configuration may include a plurality of optical fibers embedded in a substrate and configured as a two-dimensional plane structure to match a corresponding two-dimensional surface of a device that is to be monitored for temperature and/or strain variations, and/or vibrations. The three-dimensional configuration may include a plurality of optical fibers embedded in a substrate and configured as a three-dimensional structure to match a corresponding three-dimensional shape of a device that is to be monitored for temperature and/or strain variations, and/or vibrations. Depending on the dimensions of the structure to be monitored, the budget loss of the fiber system and the dynamic range of the interrogator, distances may be covered in a single chain, or with multiple fibers in parallel that may be accessed sequentially from a single interrogator by means of an optical switch.

According to examples disclosed herein, the optical fiber-based sensing membrane may be utilized with an optical time-domain reflectometer (OTDR) to determine temperature and/or strain associated with a device. The OTDR may represent an optoelectronic instrument used to characterize an optical fiber, for example, of the optical fiber-based sensing membrane. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

The OTDR may be used to determine both Brillouin and Rayleigh traces for an optical fiber, for example, of the optical fiber-based sensing membrane. In one example, in an initial acquisition, Brillouin frequency shift and Brillouin power may be used to implement an absolute referencing of a Rayleigh reference trace (or traces). The Rayleigh reference trace may represent a reference point for subsequent measurements of the Rayleigh frequency shift. In this regard, the absolute referencing of the Rayleigh reference trace (or traces) may then be used to determine temperature and/or strain associated with an optical fiber by using the Brillouin frequency shift and the Rayleigh frequency shift in subsequent acquisitions.

According to examples disclosed herein, the optical fiber-based sensing membrane may be utilized with the OTDR to determine, based on distributed measurement, temperature, strain, and/or vibrations associated with a device, such as a battery pack.

According to examples disclosed herein, an optical fiber-based sensing membrane may include at least one optical fiber and a substrate. The at least one optical fiber may be integrated in the substrate. The optical fiber-based sensing membrane may include, based on a specified geometric pattern of the at least one optical fiber, an optical fiber-based sensing membrane layout. The substrate may include a thickness and a material property. The thickness and the material property may be specified to ascertain, via the at least one optical fiber and based on the optical fiber-based sensing membrane layout, a thermal and/or a mechanical property associated with a device, or a radiation level associated with a device environment.

For the optical fiber-based sensing membrane described above, the device may include a battery pack of an electric vehicle.

For the optical fiber-based sensing membrane described above, the mechanical property may include strain and/or vibration.

For the optical fiber-based sensing membrane described above, the optical fiber-based sensing membrane layout may include a two-dimensional (2D) layout to match a corresponding 2D monitoring area layout of the device. Alternatively or additionally, the optical fiber-based sensing membrane layout may include a three-dimensional (3D) layout to match a corresponding 3D monitoring area layout of the device.

For the optical fiber-based sensing membrane described above, the substrate may include Polyimide.

For the optical fiber-based sensing membrane described above, the optical fiber and the substrate may include a combined weight of between approximately 200 g/m$^2$ to 500 g/m$^2$.

For the optical fiber-based sensing membrane described above, the optical fiber and the substrate may include a combined thickness of less than approximately 0.5 mm.

For the optical fiber-based sensing membrane described above, the specified geometric pattern of the at least one optical fiber may include a circular geometric pattern, a spiral geometric pattern, and/or a grid geometric pattern. Alternatively or additionally, the specified geometric pattern of the at least one optical fiber may include a plurality of loops, and at least one loop of the plurality of loops may be designated for calibration of the optical fiber-based sensing membrane.

For the optical fiber-based sensing membrane described above, the optical fiber-based sensing membrane layout may include a folding layout including at least one fold line.

According to examples disclosed herein, a method may include determining a geometric pattern for integration of an optical fiber in a substrate, and feeding the optical fiber towards a consolidation roller. The method may further include integrating, based on the geometric pattern and by the consolidation roller, the optical fiber onto the substrate.

For the method described above, the method may further include heating, by a heat source, the substrate to integrate the optical fiber onto the substrate.

For the method described above, the geometric pattern may include a circular geometric pattern, a spiral geometric pattern, or a grid geometric pattern.

According to examples disclosed herein, a method may include embedding an optical fiber-based sensing membrane in a device or contiguously engaging the optical fiber-based sensing membrane with the device. The optical fiber-based sensing membrane may include at least one optical fiber, and a substrate. The at least one optical fiber may be integrated in the substrate. The optical fiber-based sensing membrane may include, based on a specified geometric pattern of the at least one optical fiber, an optical fiber-based sensing membrane layout. The substrate may include a thickness and a material property. The method may further include ascertaining, via the embedded or the contiguously-engaged optical fiber-based sensing membrane, a thermal or a mechanical property associated with the device.

FIG. 1 illustrates an electric vehicle 100 including an optical fiber-based sensing membrane 102 (hereinafter referred to as "sensing membrane 102"), according to an example of the present disclosure. Referring to FIG. 1, the electric vehicle 100 may include the sensing membrane 102 disposed on a device, such as a battery pack 104. As disclosed herein, the sensing membrane 102 may include an optical fiber-based sensing membrane layout (hereinafter referred to as "sensing membrane layout 122") to accurately detect and measure temperature and/or strain variations, and/or vibrations, particularly for relatively small devices or for applications that need a relatively small spatial resolution.

The electric vehicle 100 may include other known components such as a thermal system 106 for cooling the vehicle, an auxiliary battery 108, an onboard battery charger 110, a vehicle transmission 112, a charge port 114 for the battery pack 104, a converter 116, a power electronics controller 118, and an electric traction motor 120.

Figure 2:
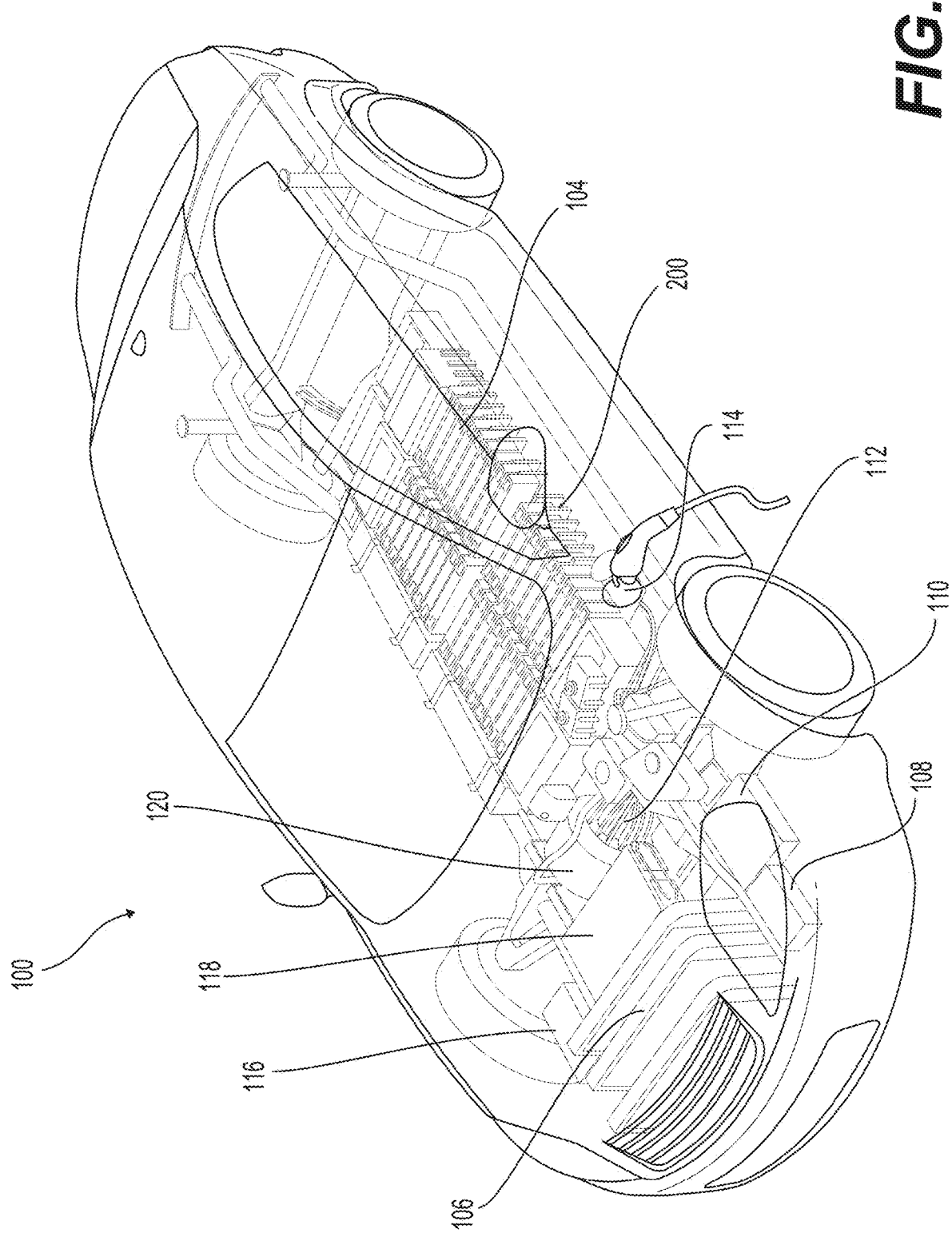
FIG. 2 illustrates the electric vehicle of FIG. 1, with the optical fiber-based sensing membrane removed, according to an example of the present disclosure.

FIG. 2 illustrates the electric vehicle 100 of FIG. 1, with the optical fiber-based sensing membrane 102 removed, according to an example of the present disclosure.

Referring to FIG. 2, the battery pack 104 is shown with the sensing membrane 102 removed. In this regard, the battery pack 104 may include, as shown, a plurality of battery cells 200. The sensing membrane 102 may be configured to sense thermal and/or strain variations, and/or vibrations associated with one, a few, or all of the battery cells 200 of the battery pack 104.

Figure 3:
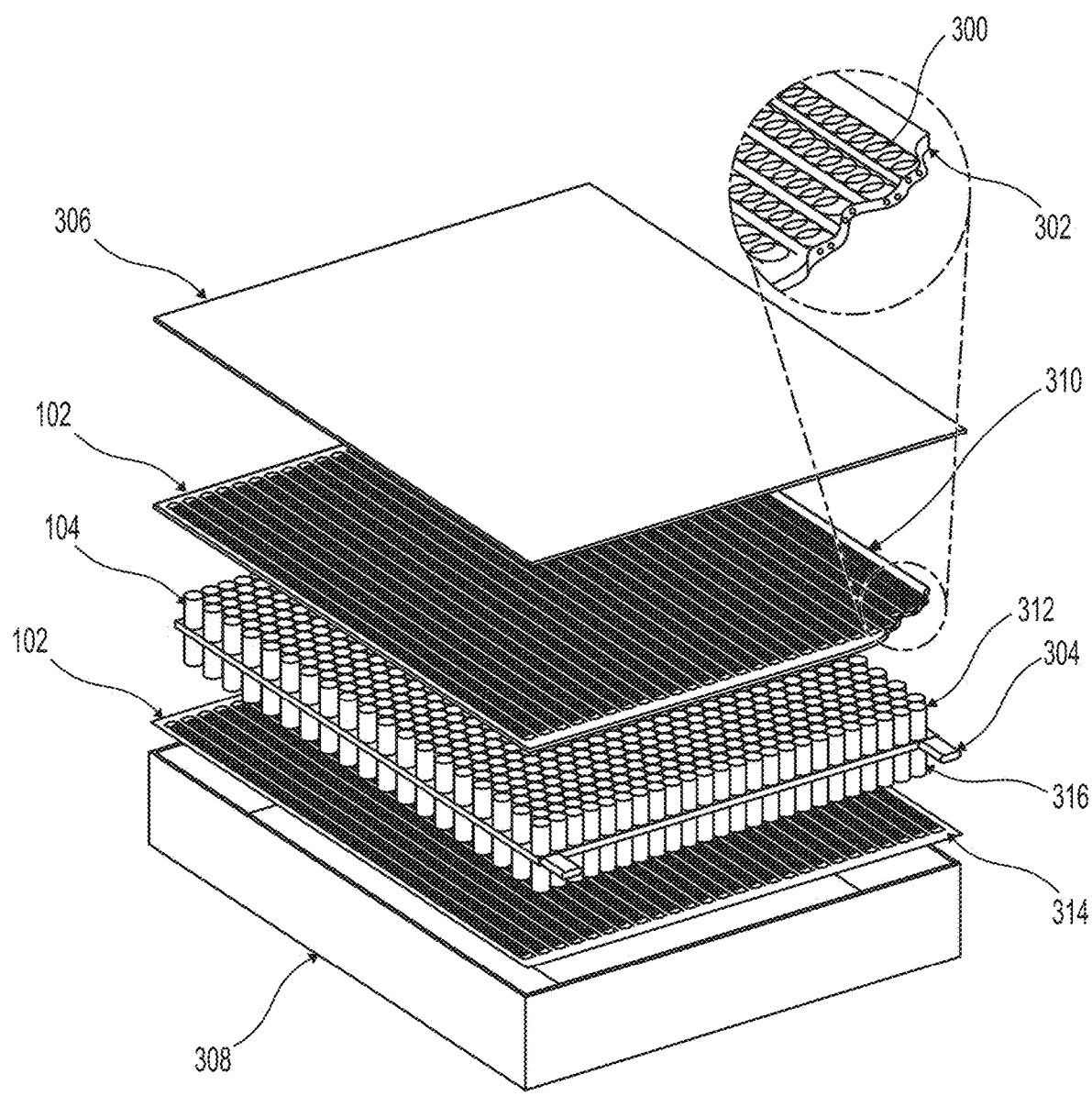
FIG. 3 illustrates a diagrammatic view illustrating the optical fiber-based sensing membrane of FIG. 1 in use, according to an example of the present disclosure.
Figure 3:
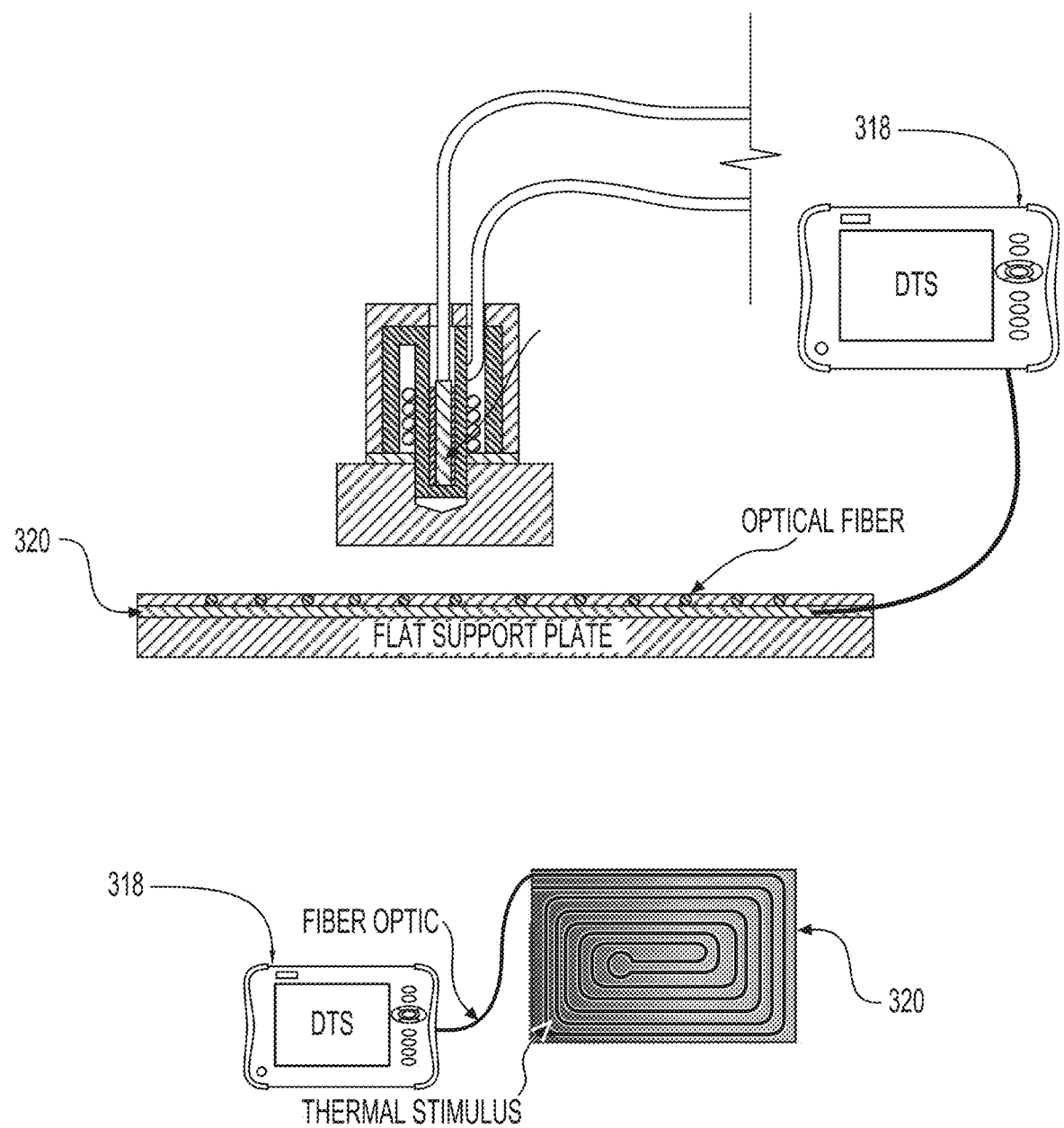

FIG. 3 illustrates a diagrammatic view illustrating the optical fiber-based sensing membrane 102 in use, according to an example of the present disclosure.

Referring to FIG. 3, the optical fiber-based sensing membrane 102 may include at least one optical fiber integrated in an adhesive substrate. In the example of FIG. 3, as shown in the enlarged view, a plurality of optical fibers 300 may be integrated in an adhesive substrate 302.

In the example of FIG. 3, sensing membranes may be disposed on upper and lower surfaces of the battery pack 104 in the orientation of FIG. 3. The battery pack 104 may include a plurality of battery cells. The battery cells may include, in the example shown, a cooling system 304 between upper and lower sets of battery cells in the orientation of FIG. 3. The upper and lower sensing membranes, and the battery pack 104 may be enclosed in an enclosure, with upper and lower layers 306 and 308 of the enclosure shown in the orientation of FIG. 3.

For the example of FIG. 3, the sensing membrane 102 at 310 may be used to sense thermal and/or strain variations, and/or vibrations of upper battery cells at 312, and the sensing membrane 102 at 314 may be used to sense thermal and/or strain variations, and/or vibrations of lower battery cells at 316.

The adhesive substrate may include Polyimide, or another such material. The Polyimide material may provide the requisite durability with respect to vibrations associated with the battery pack 104 and/or other components that may be engaged with the sensing membrane 102. Similarly, the Polyimide material may provide the requisite durability with respect to temperature variations associated with the battery pack 104 and/or other components, which may be on the order of −40° C. to 140° C., or include a greater range than −40° C. to 140° C. Further, the Polyimide material may provide the requisite flexibility associated with surface variations associated with the battery pack 104 and/or other components that may be engaged with the sensing membrane 102. The Polyimide material may also be transparent, and thus provide sufficient transmission of light into the optical fiber for detection of light or an anomaly (e.g., a high temperature event) associated with the battery pack 104.

The sensing membrane 102 may be of a light weight (e.g., 200-500 g/m$^2$). In this regard, the sensing membrane 102 may add minimal weight with respect to the device being monitored for thermal and/or strain variations, and/or vibrations.

The sensing membrane 102 may be approximately 0.5 mm, to thus minimize integration challenges with respect to the device being monitored for thermal and/or strain variations, and/or vibrations. In this regard, the optical fibers embedded in the sensing membrane 102 may be on the order of 0.25 mm in thickness. For the geometric patterns of optical fibers that include optical fiber crossings, such optical fibers may be treated after the sensing membrane is assembled, for example, by a combined action of pressure and temperature above the melting point of the optical fiber coating while the sensing membrane material is unaffected. Thus, the overall thickness of 0.5 mm may thus add minimal thickness associated with the battery pack 104.

With continued reference to FIG. 3, one example of a test set-up to evaluate performances of distributed temperature sensing systems based on distributed temperature sensing interrogator (DTS) 318 (also referred to herein as distributed temperature sensor) and fiber sensing membrane 320 is shown, and may be utilized to sense temperature, but also strain variations using a distributed strain sensing interrogator in place of the DTS. In this regard, the distributed temperature sensing interrogator 318, which may include an OTDR, may be utilized with the various examples of the sensing membrane 102 as disclosed herein.

Figure 4:
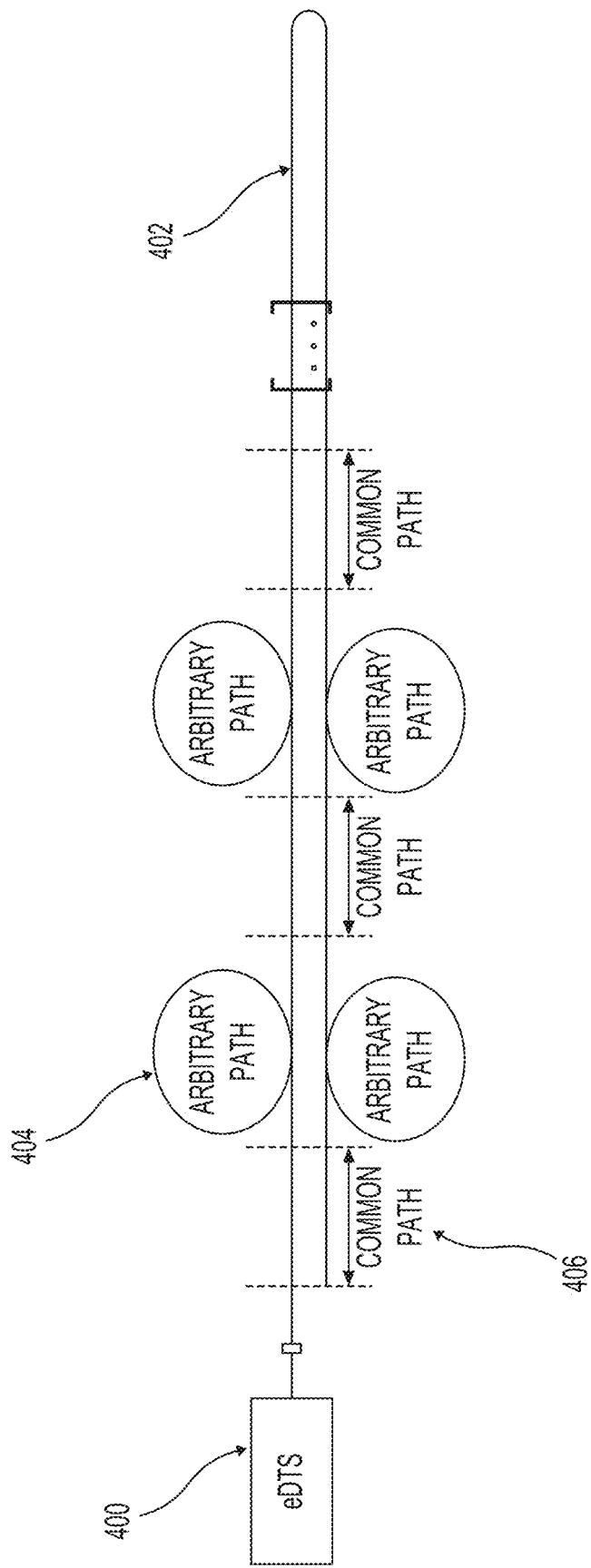
FIG. 4 illustrates a diagrammatic view illustrating an embedded distributed temperature sensor that utilizes the optical fiber-based sensing membrane of FIG. 1, according to an example of the present disclosure.

FIG. 4 illustrates a diagrammatic view illustrating an embedded distributed temperature sensor (eDTS) that utilizes the sensing membrane 102, according to an example of the present disclosure.

Referring to FIG. 4, an embedded distributed temperature sensor 400 may be positioned as shown for temperature sensing associated with an optical fiber 402. For the example of FIG. 4, the optical fiber 402 may include arbitrary paths as shown at 404, and common paths as shown at 406. Regarding common paths, the minimal configuration may include one common path joining the two optical fiber ends, but higher accuracy may be obtained in the loss compensation with multiple common paths evenly distributed over the total sensing length, and an even higher accuracy may be obtained with a complete folding of the entire optical fiber. The embedded distributed temperature sensor 400 may provide for continuous monitoring of a device, such as the battery pack 104.

Figure 5A:
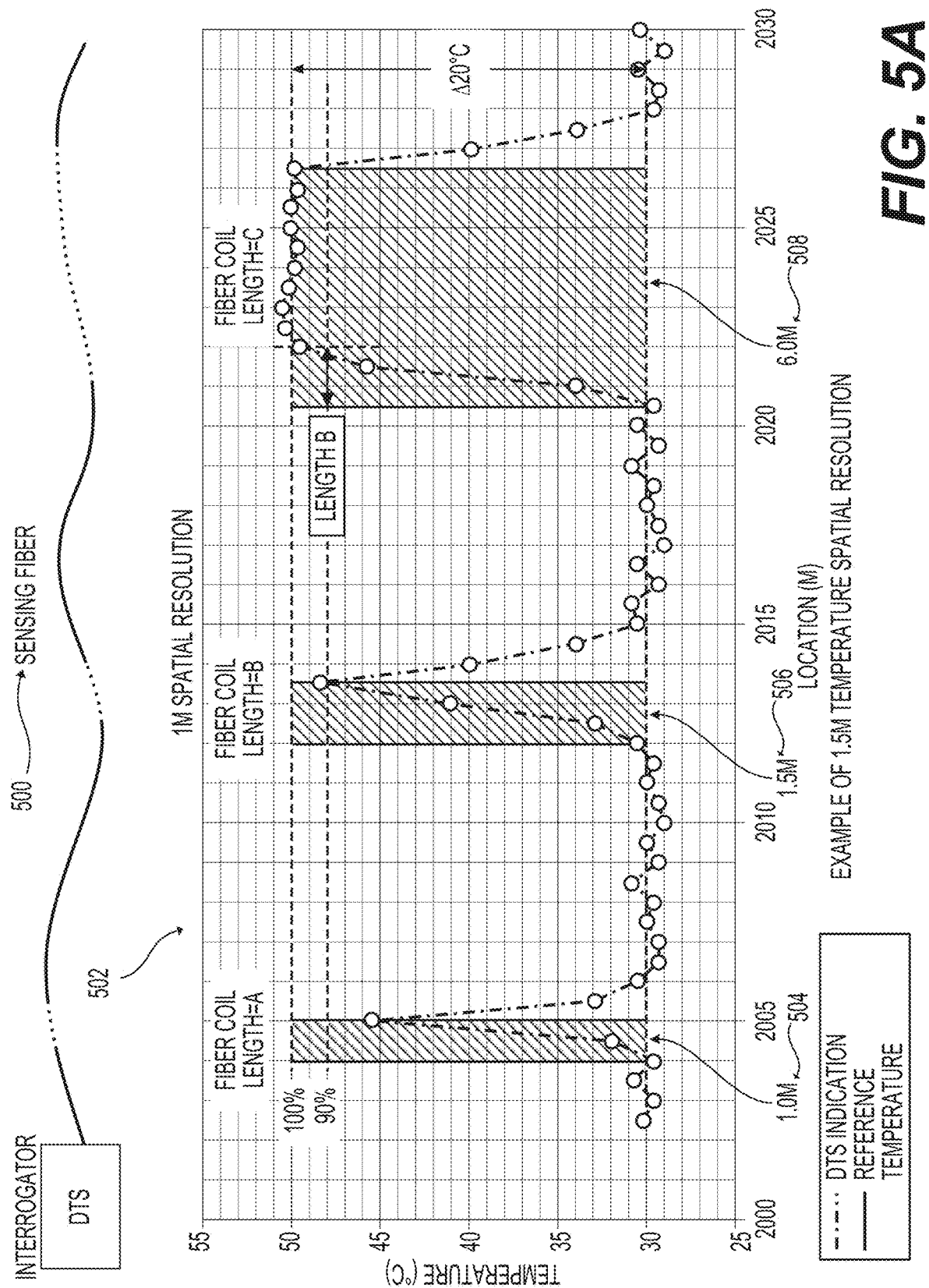
FIGS. 5A and 5B respectively illustrate a temperature spatial resolution graph, and an example of spatial resolution, according to an example of the present disclosure.
Figure 5B:
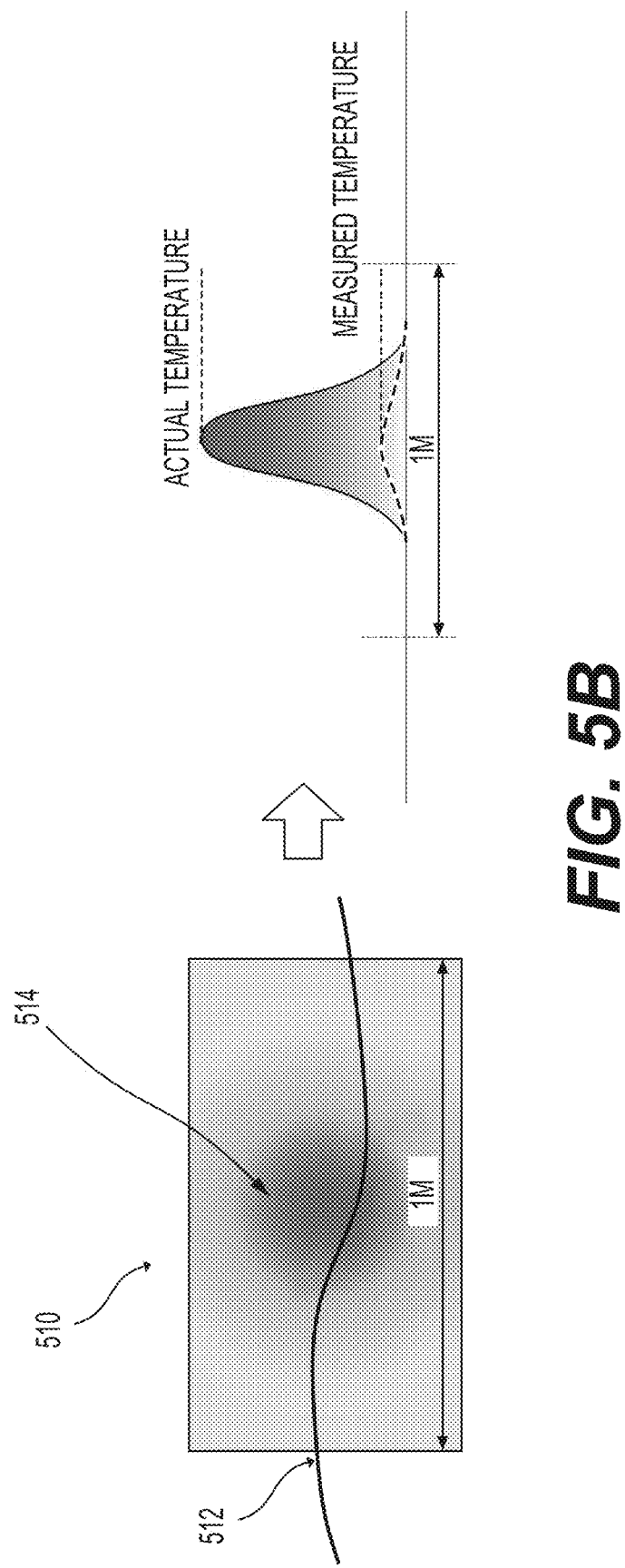

FIGS. 5A and 5B respectively illustrate a temperature spatial resolution graph, and an example of spatial resolution, according to an example of the present disclosure.

Referring to FIG. 5A, spatial resolution may represent a smallest length of the temperature affected fiber optic sensor for which a distributed fiber optic system can measure a reference temperature of a hotspot fiber condition within a specified temperature measurement error of the distributed temperature sensor system. For example, for a spatial resolution on the order of millimeters and including a delta of 0.1° C. may be utilized for monitoring cells, a spatial resolution on the order of centimeters and including a delta of 0.1° C. may be utilized for monitoring modules, and a spatial resolution on the order of meters and including a delta of 1° C. may be utilized for monitoring systems. In this regard, an example of a 1.5 m temperature spatial resolution for a sensing fiber 500 is shown at 502. Examples of spatial resolution are illustrated for different fiber coil length, for example, of 1.0 m and 504, 1.5 m at 506, and 6.0 m at 508. As shown at 504, since the temperature spatial resolution is specified as 1.5 m, the measurement at 504 shows a lower than 90% temperature measurement. The measurement at 506 shows a greater than 90% temperature measurement, and the measurement at 508 shows a 100% temperature measurement.

Referring to FIG. 5B, with fiber sensing solutions of a specified spatial resolution, it may not be possible to monitor discrete temperature variations occurring on elements with smaller dimensions, and the loss calibration along an optical fiber may also be relatively complex. In this regard, as shown at 510, if an optical fiber is in contact over a length that is less than the spatial resolution, an associated distributed temperature sensor may not measure an amplitude accurately. For example, as shown at 510, if optical fiber 512 is in contact over a length that is less than the darkened area at 514 that represents a temperature spike, an associated distributed temperature sensor may not measure an amplitude accurately. In this regard, a spatial resolution of approximately 1.0 m may be specified to ascertain a complete measurement of the temperature spike.

Figure 6:
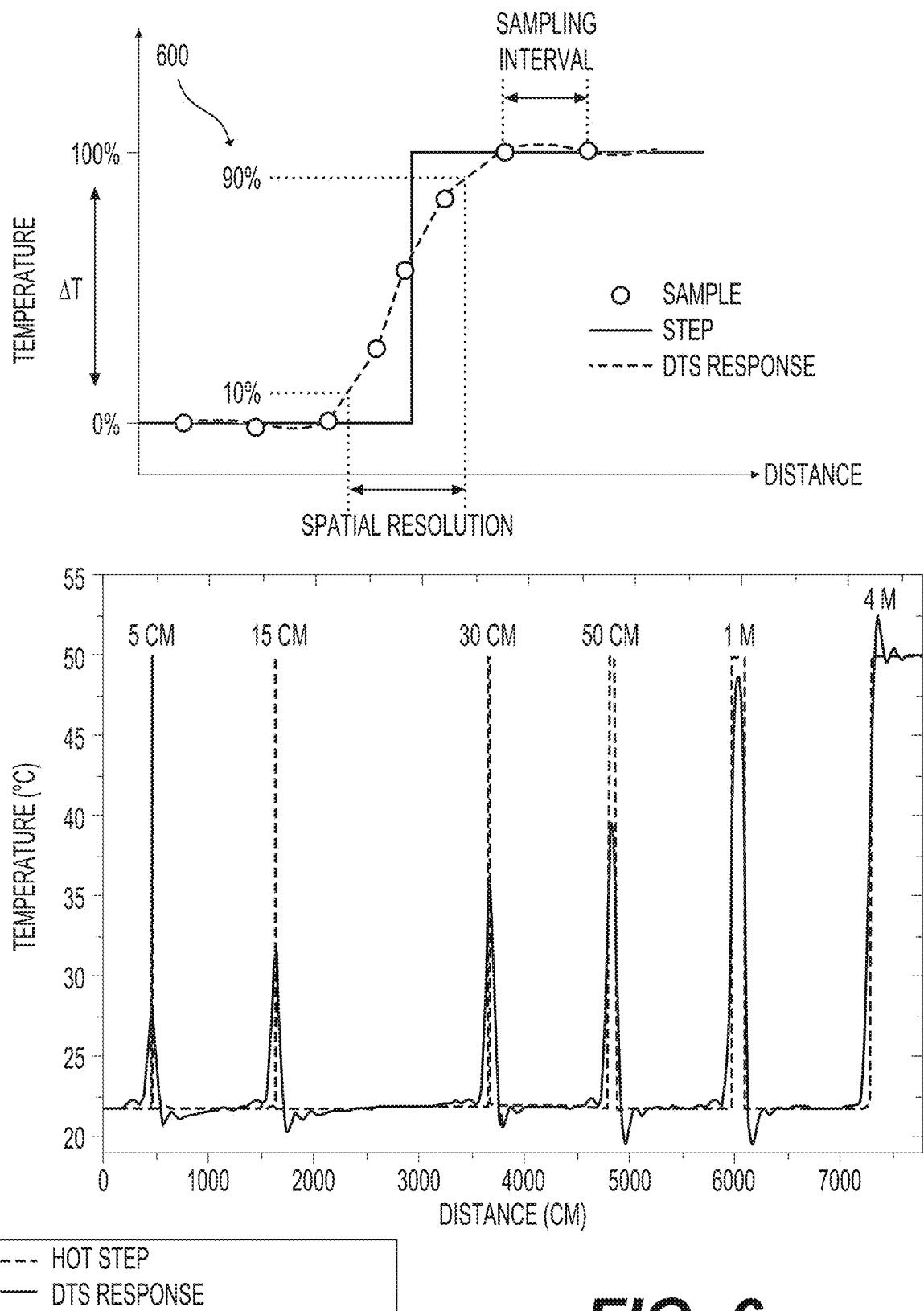
FIG. 6 illustrates further details of spatial resolution, according to an example of the present disclosure.
Figure 6:
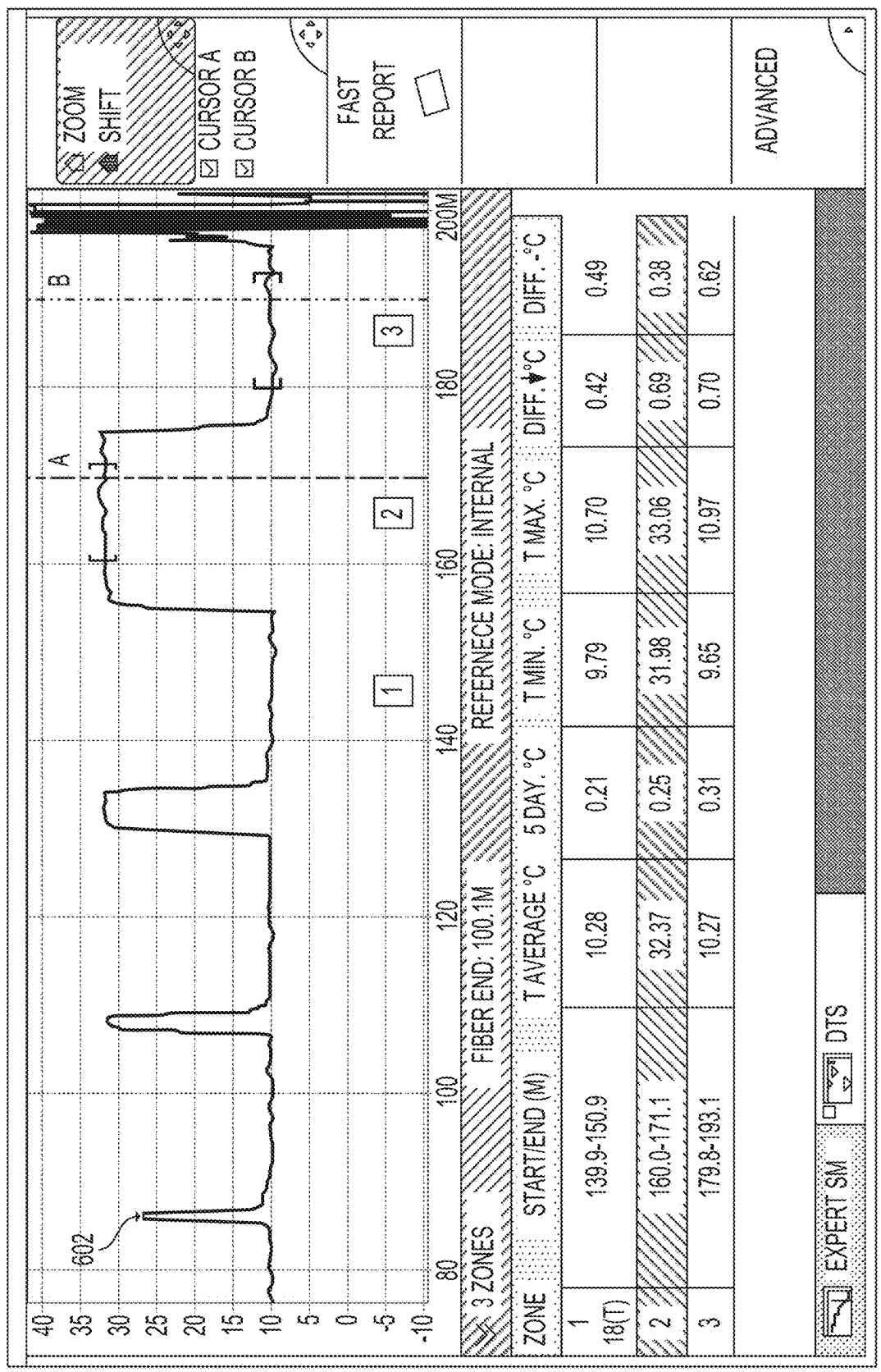

FIG. 6 illustrates further details of spatial resolution, according to an example of the present disclosure.

Referring to FIG. 6, with respect to another example of spatial resolution, spatial resolution may represent a shortest length of an optical fiber which has to be subjected to a localized temperature step in order that a system (e.g., a distributed temperature sensor) returns approximately 90% of the response (e.g., as shown at 600). The 90% response criteria may be applied to determine spatial resolution to thus consider a length required to monitor 80% of a step change. Thus, as shown at 602, if a temperature stimulus is shorter than the spatial resolution, the temperature event may be detected but not accurately measured. Thus, it is technically challenging to accurately detect and measure temperature, particularly for applications that include a relatively small spatial resolution, for example, on the order of millimeters or centimeters.

Figure 7:
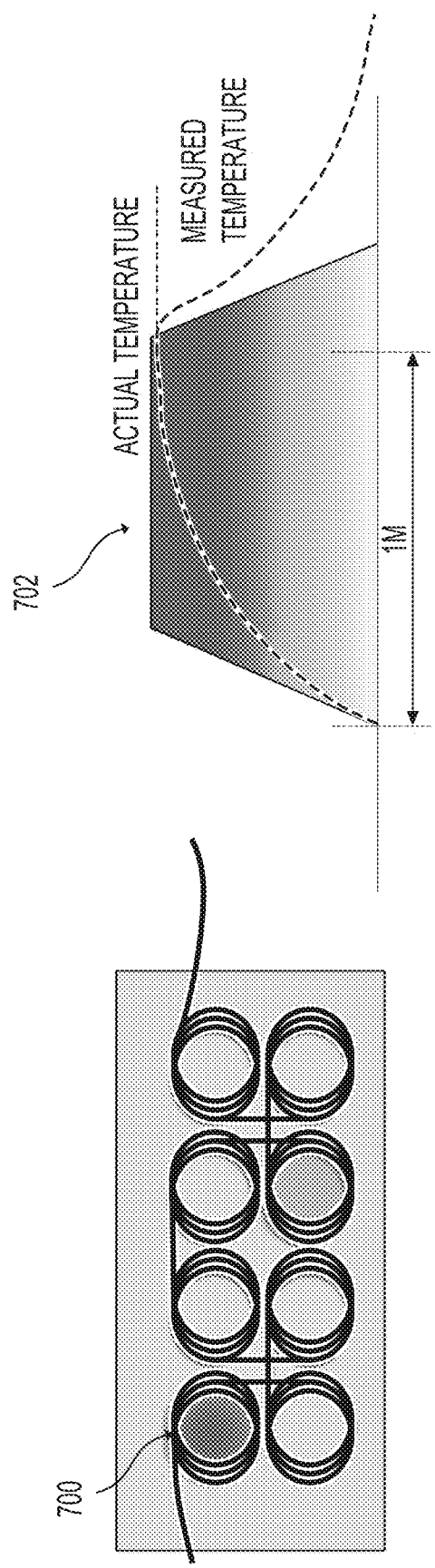
FIG. 7 illustrates an optical fiber-based sensing membrane layout including a coil with multiple layers, according to an example of the present disclosure.

FIG. 7 illustrates the sensing membrane layout 122 including a coil with multiple layers, according to an example of the present disclosure.

Referring to FIG. 7, in order to address the aforementioned technical challenges associated with accurate detection and measurement of temperature and/or strain variations, and/or vibrations, particularly for relatively small devices or for applications that need a relatively small spatial resolution, in some examples, the sensing membrane layout 122 may include a total length of an optical fiber that is increased to a value that is higher than a spatial resolution of the associated fiber sensing solution. In this regard, in some examples, the sensing membrane layout 122 may include an optical fiber that is patterned in a coil as shown at 700 with single or multiple layers. The coils may be built according to different spooling techniques. As disclosed herein, the sensing membrane layout 122 may include an optical fiber or fibers with other geometric patterns. For example, as shown at 700, if a fiber is folded back onto a common path, then these common paths where a seam temperature is shared, may allow for a precise measurement of the optical fiber loss that is needed for accuracy of a fiber sensing solution. Thus, the coiling as shown at 700 may provide for accurate temperature measurement, as shown at 702. A number of the coils may be based on a total length that is needed for a specified spatial resolution as disclosed herein. For example, n coils that include a total length of x m may be utilized to provide a 90% or higher response. Thus a number of the coils may be determined based on a total length needed for a specified response, and a diameter of each coil. In this regard, each coil of a set of coils may include equal or unequal diameters.

Figure 8:
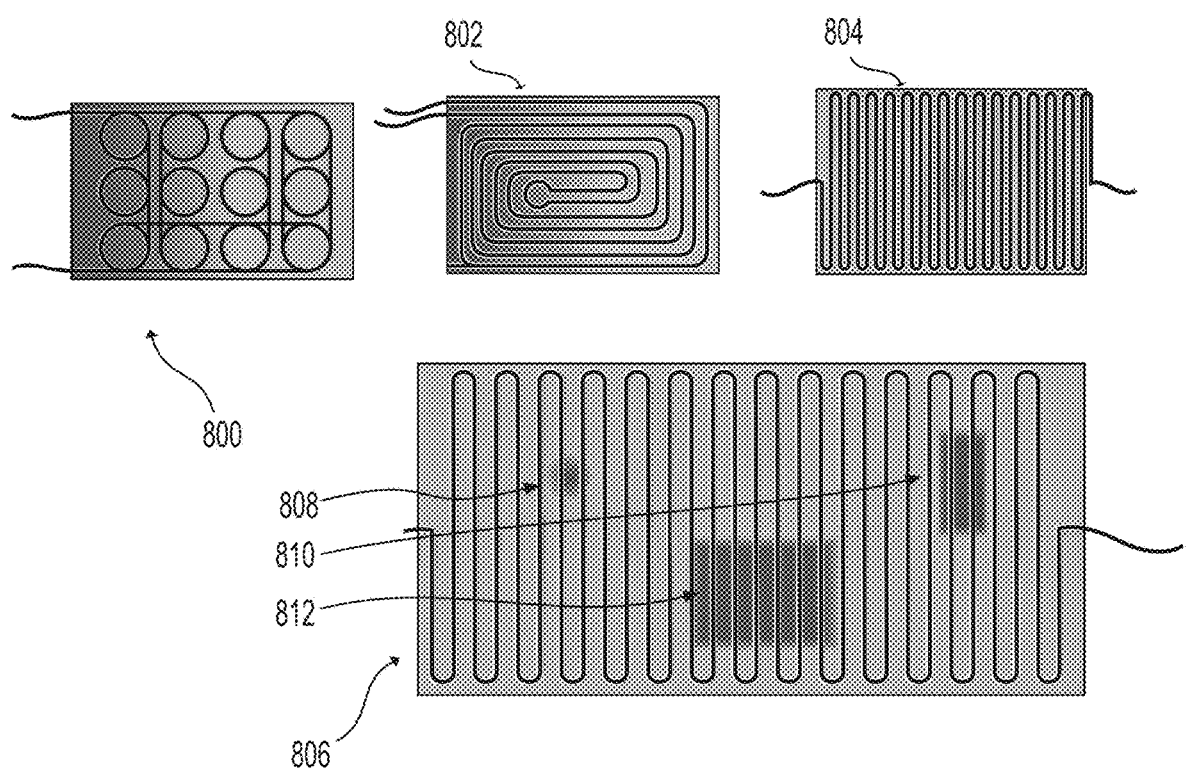
FIGS. 8 and 9 illustrate further examples of the optical fiber-based sensing membrane layout, according to an example of the present disclosure.
Figure 9:
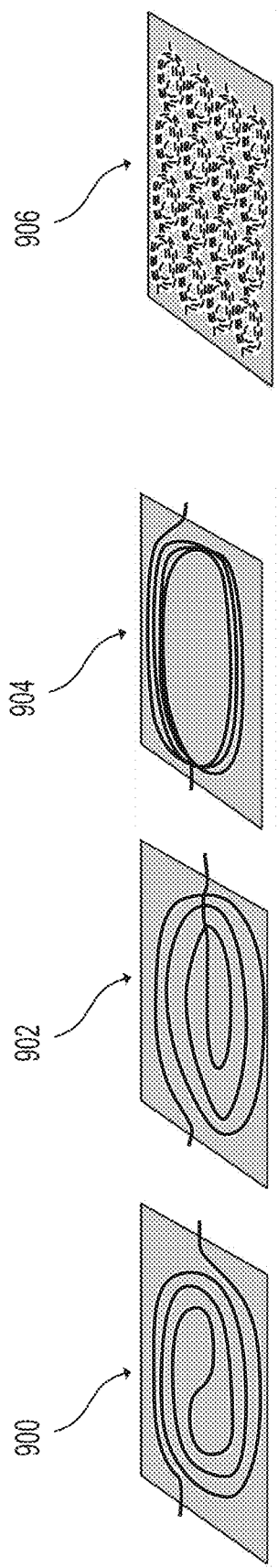

FIGS. 8 and 9 illustrate further examples of the sensing membrane layout 122, according to an example of the present disclosure.

Referring to FIG. 8, as disclosed herein, the sensing membrane layout 122 may include an optical fiber or fibers with other geometric patterns. For example, geometric patterns may include loops as shown at 800, a meander-line coil as shown at 802, and spirals as shown at 804 and 806. The loops as shown at 800 may represent a quasi-distributed two dimensional shape. The meander-line coil as shown at 802 may represent a distributed shape. Other types of shapes may include repetitive shapes with multiple loops, stacks of fiber loops, geometric patterns that include fiber crossing, square spirals, two dimensional spiral, three-dimensional spiral, etc. For the geometric pattern shown at 806, various temperature or strain events may be detected, for example, at 808, 810, and 812. In this regard, for the geometric pattern shown at 806, various temperature or strain events may be detected across a single length of an optical fiber (e.g., at 808) or across multiple lengths of the optical fiber (e.g., at 810 and 812).

Referring to FIG. 9, the sensing membrane layout 122 may include other types of geometric patterns that include an optical fiber without crossing as shown at 900, an optical fiber with crossing as shown at 902, fiber strands with optical fiber crossing as shown at 904, and a replicated layout as shown at 906.

Figure 10:
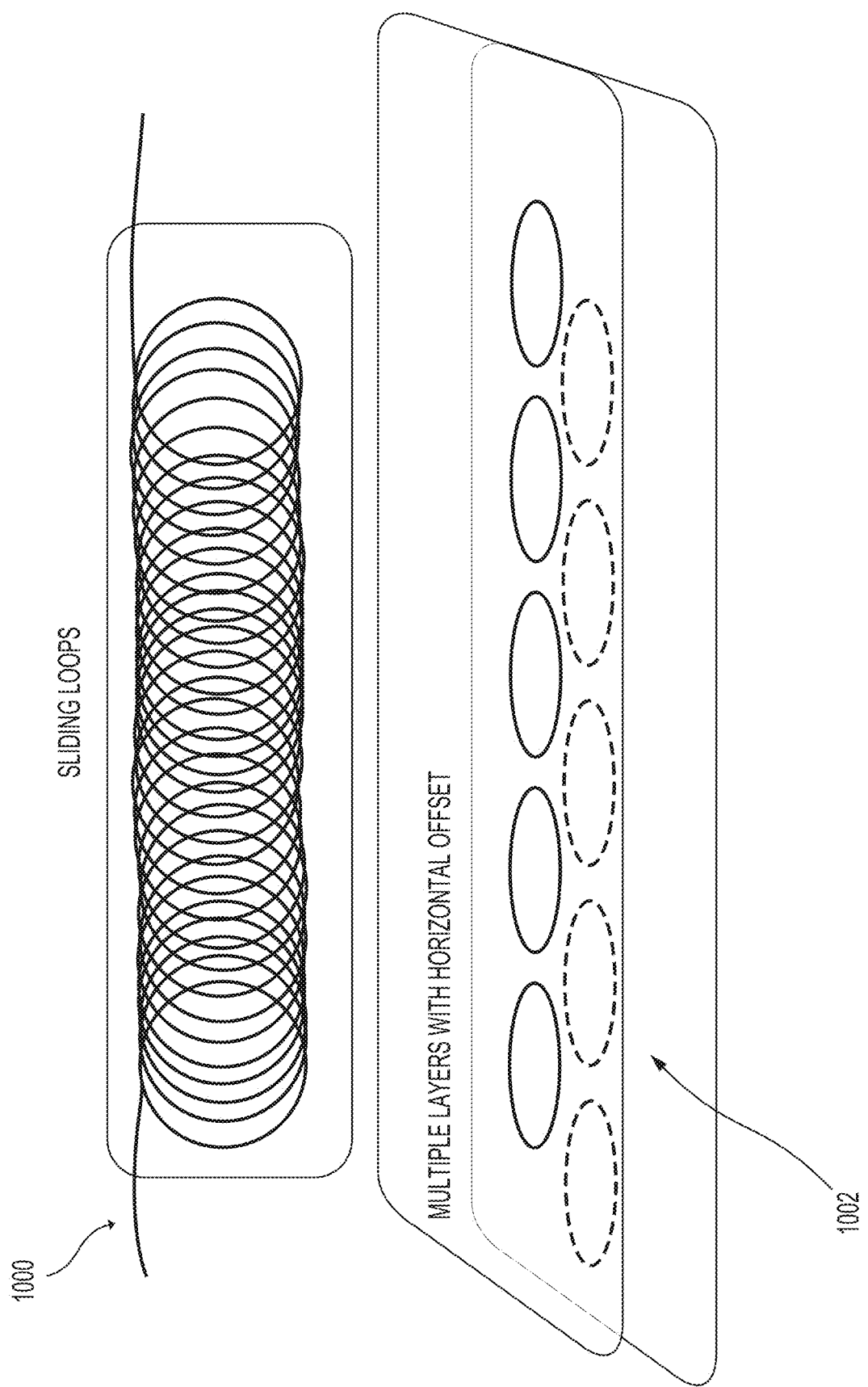
FIG. 10 illustrates an optical fiber-based sensing membrane layout including sliding loops, according to an example of the present disclosure.

FIG. 10 illustrates the sensing membrane layout 122 including sliding loops, according to an example of the present disclosure.

Referring to FIGS. 1 and 10, with respect to the geometric patterns of the sensing membrane layout 122, the sensing membrane 102 may include a sliding loops arrangement as shown at 1000. An additional transverse triangle sliding movement with an amplitude of the order of several mm and a slope exceeding one optical fiber diameter for each loop may be applied to avoid accumulation of several optical fiber layers as apparent at top and bottom at 1000. Another solution to fiber accumulation may include a hybrid concentric spiral and sliding layout, with, for example, N concentric turns applied and a N times larger sliding step (compared to one chosen for the pure sliding loop pattern, and therefore with an equivalent spatial resolution). The repeated pattern may cover the entire surface to be monitored with a single layer, but as shown at 1002, the sensing membrane 102 may include multiple layers with an horizontal offset in the orientation of FIG. 10, which may further increase the density of the optical fiber and associated spatial resolution of the sensor.

Figure 11:
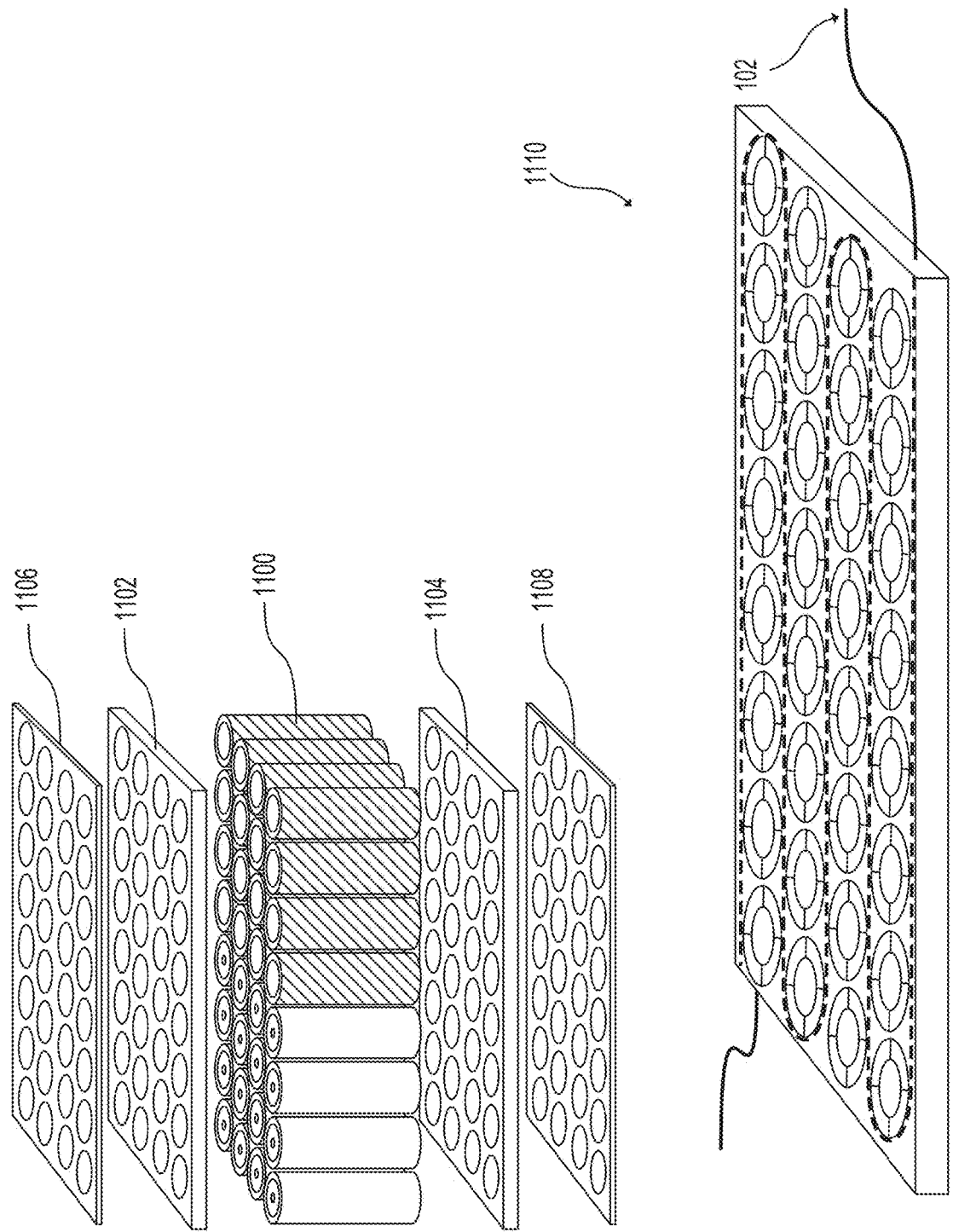
FIG. 11 illustrates an optical fiber-based sensing membrane layout including an optical fiber-based sensing membrane embedded in a battery cell insert, according to an example of the present disclosure.

FIG. 11 illustrates the sensing membrane layout 122 including the sensing membrane 102 embedded in a battery cell insert, according to an example of the present disclosure.

Referring to FIGS. 1 and 11, the sensing membrane 102 of the various geometric patterns disclosed herein may be embedded in a battery cell insert of the battery pack 104. For example, for the battery cells 1100, a battery cell insert 1102 may be positioned on an upper surface of the battery cells in the orientation of FIG. 11, and a battery cell insert 1104 may be positioned on the lower surface of the battery cells. The battery pack 104 may further include a collector plate 1106 positioned on an upper surface of the battery cell insert 1102, and a collector plate 1108 positioned on a lower surface of the battery cell insert 1104. In this manner, as shown at 1110, the sensing membrane 102 may be embedded in battery cell inserts 1102 and 1104.

Figure 12:
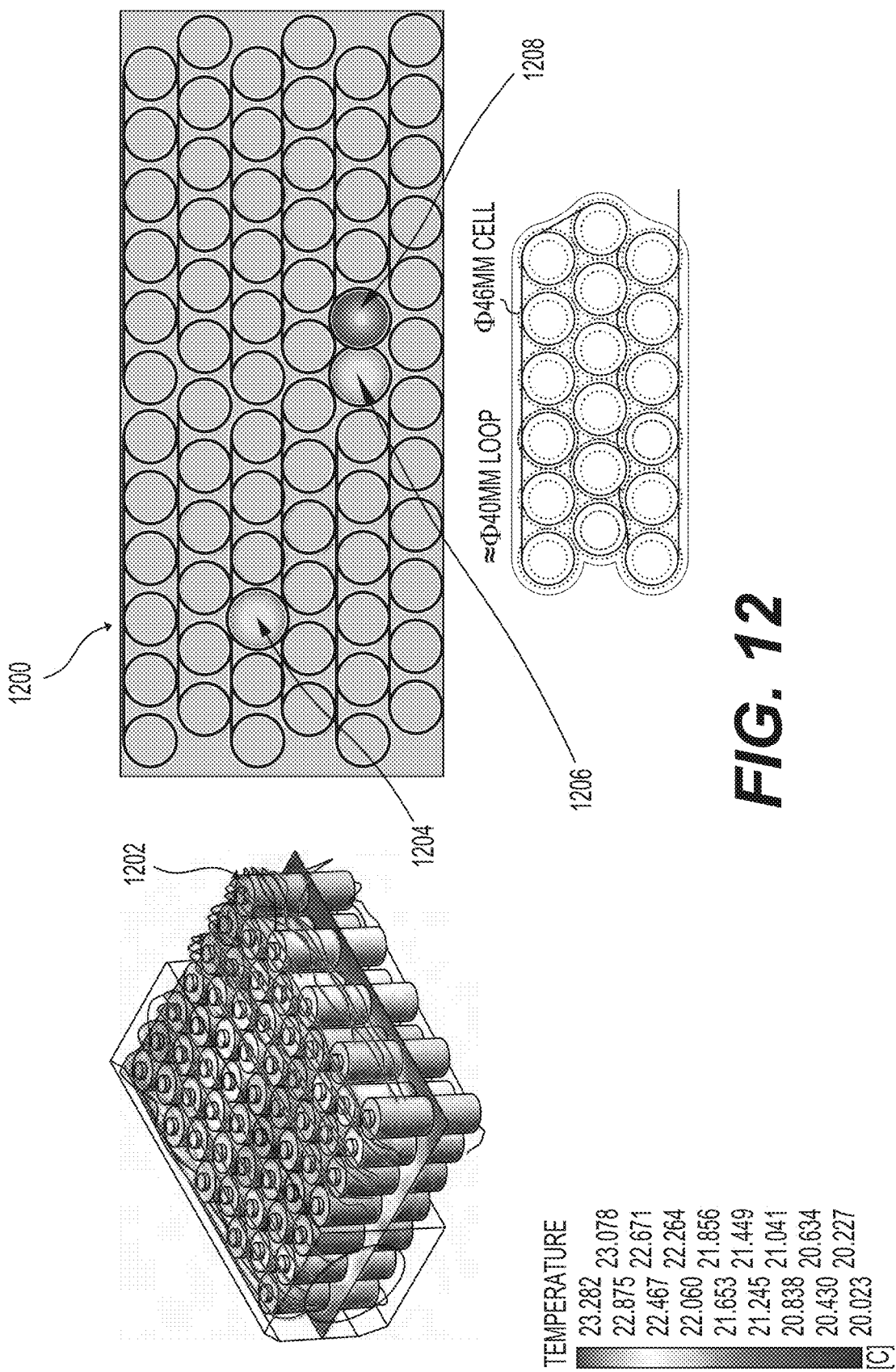
FIG. 12 illustrates an optical fiber-based sensing membrane layout including loops in series, according to an example of the present disclosure.

FIG. 12 illustrates the sensing membrane layout 122 including loops in series, according to an example of the present disclosure.

Referring to FIGS. 1 and 12, with respect to monitoring of the battery pack 104, the sensing membrane layout 122 may include loops in series as shown at 1200. In this regard, each loop may be used to address a single battery cell 1202 of the battery pack 104. In this manner, when a temperature, strain, and/or vibration event occurs at a battery cell such as battery cell 1204, 1206, or 1208, an associated loop may be used to detect a temperature, strain, and/or vibration event.

Figure 13:
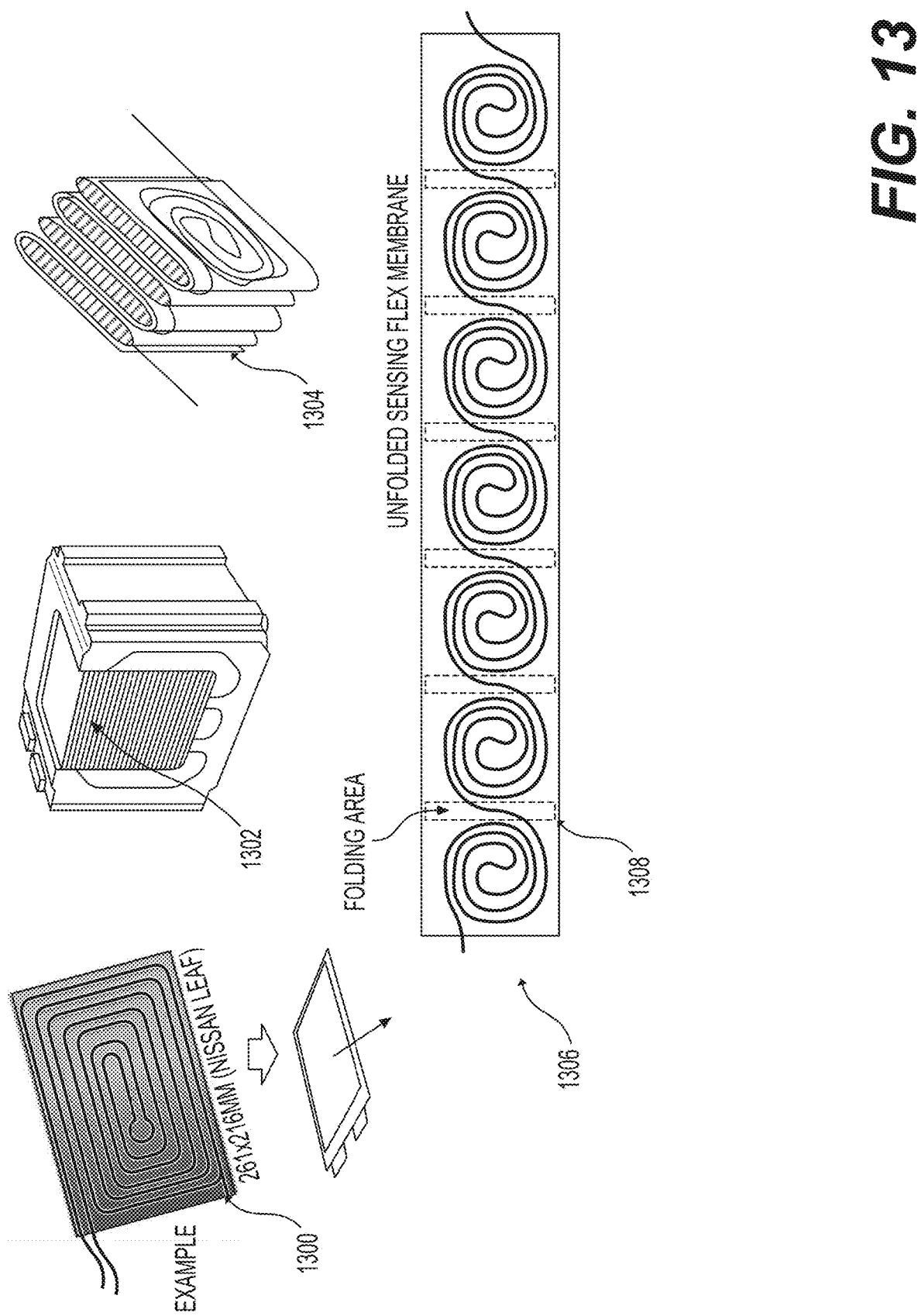
FIG. 13 illustrates further examples of the optical fiber-based sensing membrane layout, according to an example of the present disclosure.

FIG. 13 illustrates further examples of the sensing membrane layout 122, according to an example of the present disclosure.

Referring to FIGS. 1 and 13, the sensing membrane layout 122 may be applied to a variety of cell types. For example, as shown at 1300, the sensing membrane layout 122 may include a meander-line coil layout applied to a single pouch cell. As shown at 1302, for a stack of cells that form a module, the sensing membrane layout 122 may include a ribbon-layout applied to a stack of cells as shown at 1304. As shown at 1306, for the ribbon-layout shown at 1304, this layout is shown in an unfolded configuration at 1306 and includes the sensing membrane 102 including fold areas 1308.

Figure 14:
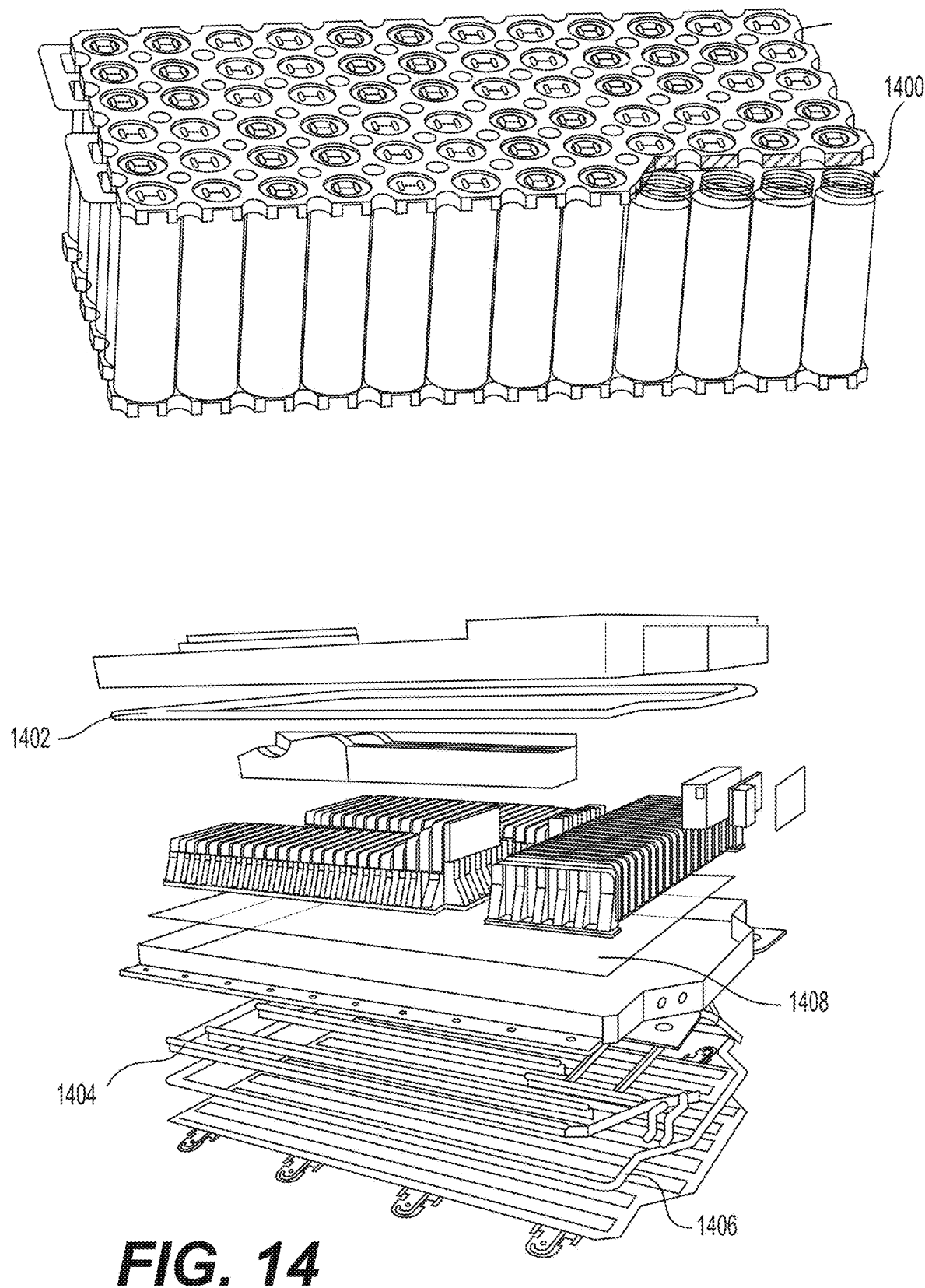
FIG. 14 illustrates an optical fiber-based sensing membrane layout including an optical fiber embedded in battery molded parts, according to an example of the present disclosure.

FIG. 14 illustrates the sensing membrane layout 122 including an optical fiber embedded in battery molded parts, according to an example of the present disclosure.

Referring to FIG. 14, the sensing membrane layout 122 may include an optical fiber embedded in a device, such as molded parts of the battery pack 104. For example, an optical fiber may be inserted in an insert or thermally conductive gap filler of the battery pack 104. An example of an optical fiber inserted in an insert or thermally conductive gap filler of the battery pack 104 is shown at 1400. Other components associated with the battery pack 104 where an optical fiber or sensing membrane 102 may be inserted may include a battery pack sealing assembly at 1402, a thermal conductive adhesive at 1404, a structural adhesive at 1406, and/or a thermally conductive gap filler at 1408.

Figure 15:
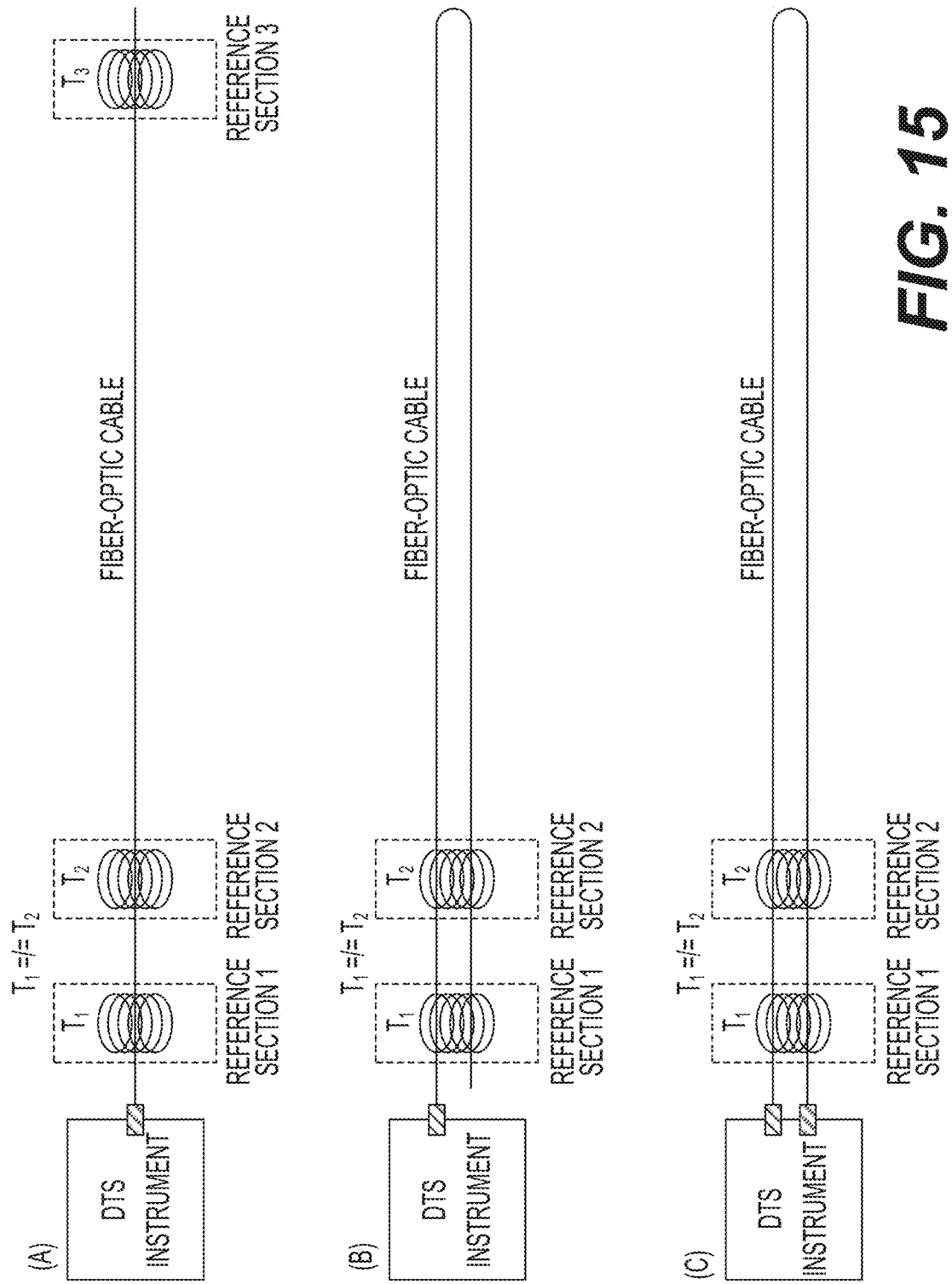
FIGS. 15-17 illustrate dynamic temperature sensing measurements and associated calibrations, according to an example of the present disclosure.
Figure 16:
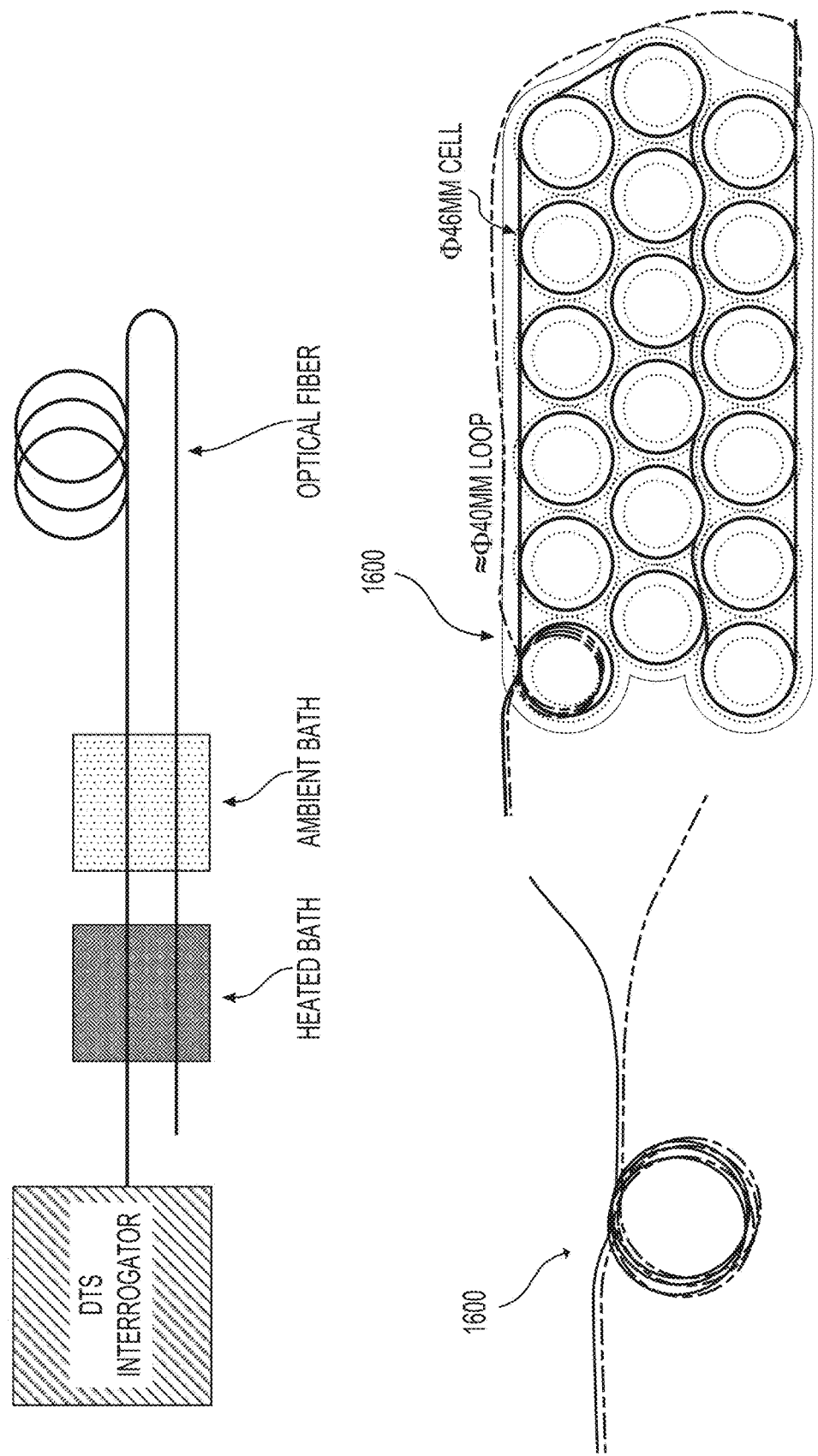
Figure 17:
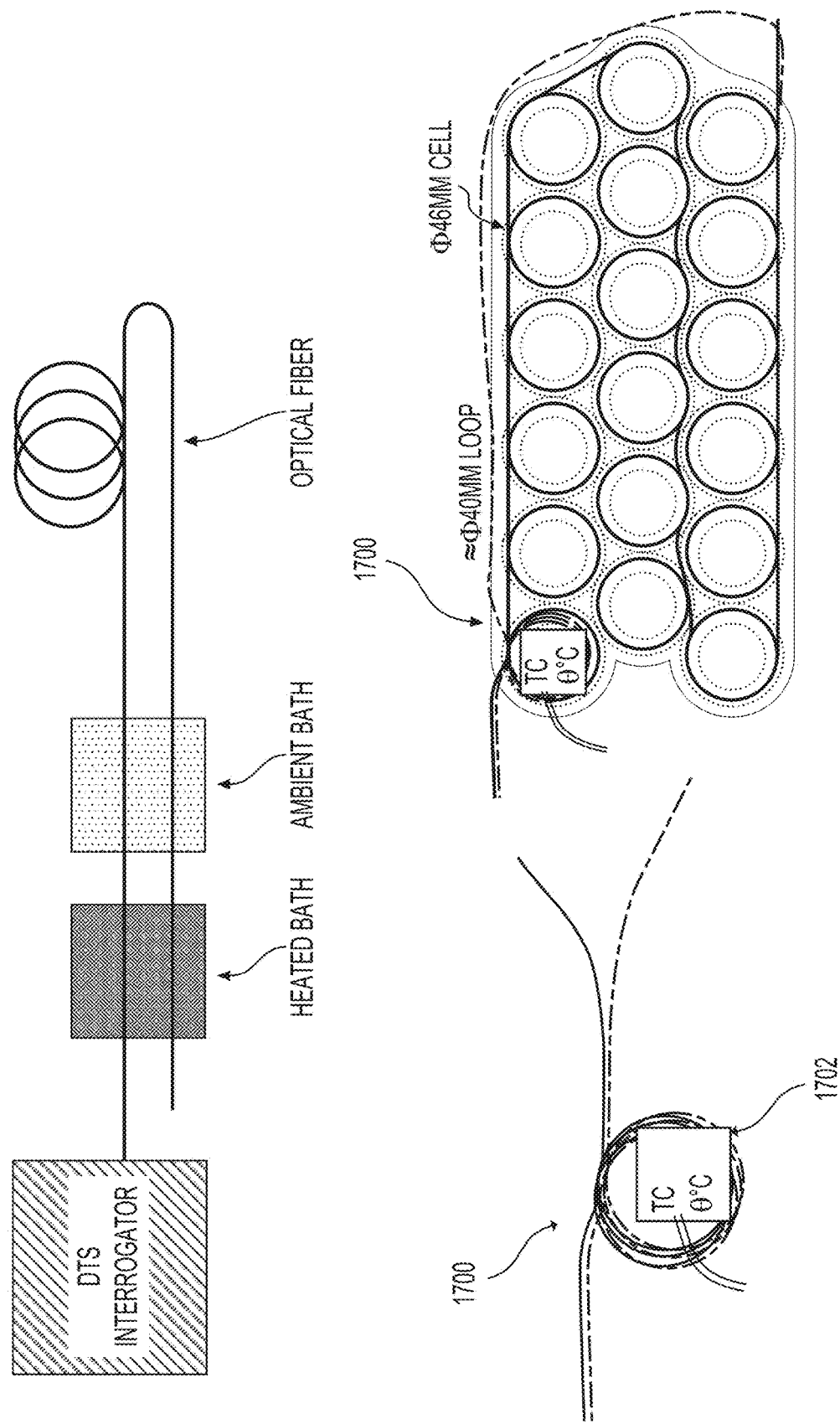

FIGS. 15-17 illustrate dynamic temperature sensing measurements and associated calibrations, according to an example of the present disclosure.

Referring to FIG. 15, the sensing membrane layout 122 as disclosed herein may include various loops and other geometric patterns. In this regard, depending on the geometric pattern, different calibration techniques may need to be applied with respect to loss distribution. For example, distributed temperature sensing measurements may incur errors due to differential attenuation. The same temperature may be interpreted as different temperatures depending on a position along an optical fiber. In this regard, calibration may be performed, for example, by utilizing reference zones, subjected to the same temperature, or subjected to a known absolute temperature. Different calibration methods may vary with measurement setup (e.g., single-ended, dual source, etc.).

Referring to FIG. 16, with respect to distributed temperature sensor temperature calibration, for example, to compensate for loss, as shown at 1600, a plurality (e.g., two) reference loops may be superimposed, and are therefore subjected to the same temperature. In this regard, an absolute value (offset) may be calibrated during initiation of the temperature, strain, and/or vibration sensing.

Referring to FIG. 17, with respect to distributed temperature sensor temperature calibration, for example, to compensate for loss, as shown at 1700, a plurality (e.g., two) reference loops may be superimposed, and are therefore subjected to the same temperature. In this regard, the calibration may be based on the reading of a dedicated sensor (e.g., a thermocouple as shown at 1702).

Figure 18:
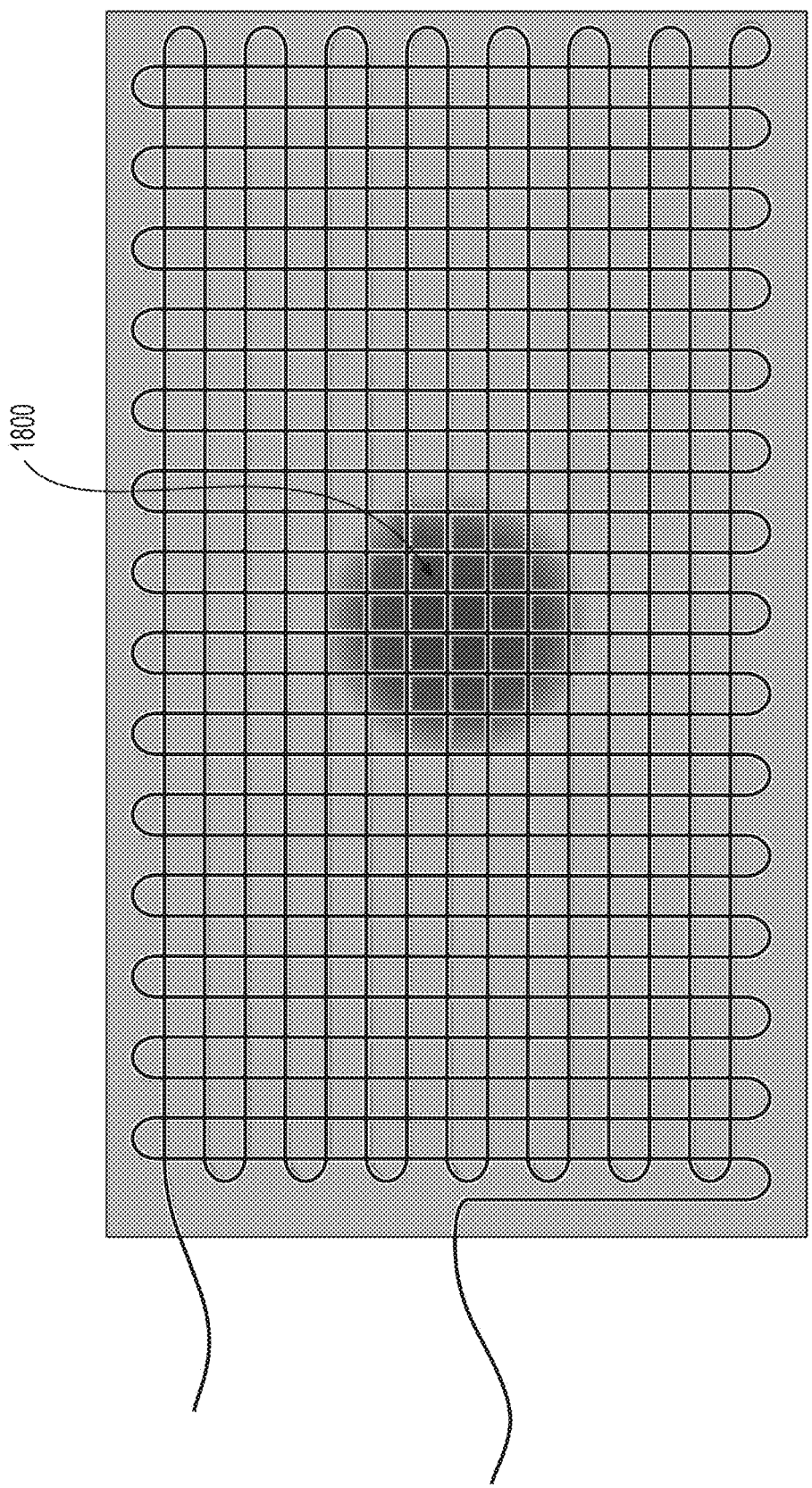
FIG. 18 illustrates a fiber grid overlay, according to an example of the present disclosure.

FIG. 18 illustrates a fiber grid overlay, according to an example of the present disclosure.

Referring to FIG. 18, with respect to fiber grid overlay (e.g., temperature, pressure, strain, vibration sensing), the sensing membrane layout 122 including multiple optical fiber crossings may be utilized to either detect pressure, strain, vibration, and/or mechanical shock using distributed loss or strain. In this regard, for a pressure spot as shown at 1800, the multiple optical fiber crossings may increase a detection capability with respect to pressure, strain, vibration, and/or mechanical shock.

Figure 19:
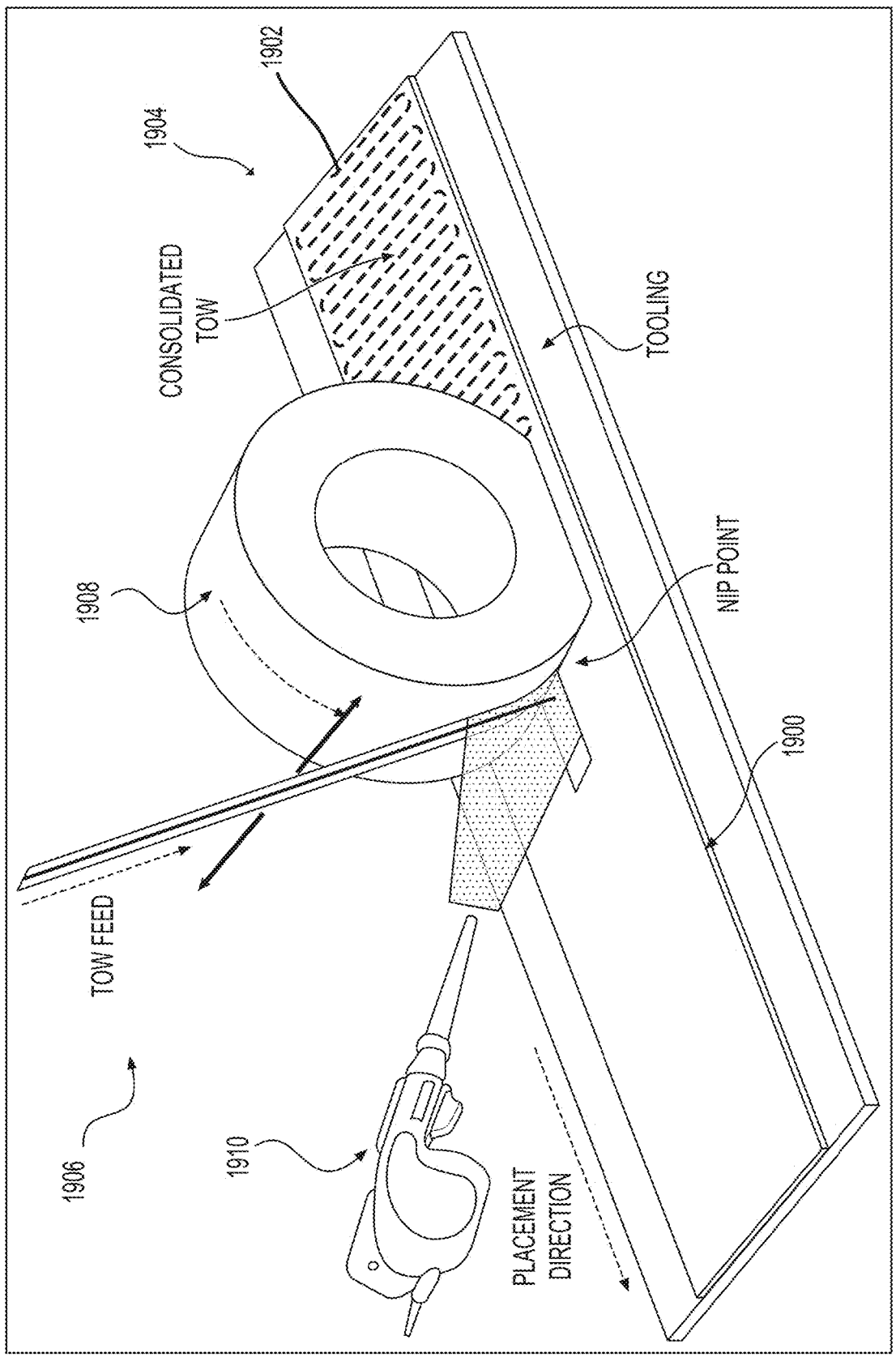
FIG. 19 illustrates a method of manufacturing the optical fiber-based sensing membrane, according to an example of the present disclosure.

FIG. 19 illustrates a method of manufacturing the sensing membrane 102, according to an example of the present disclosure.

Referring to FIGS. 1 and 19, the sensing membrane 102 that includes various examples of the sensing membrane layout 122 as disclosed herein may be manufactured as shown. For example, the sensing membrane 102 may include a substrate 1900 that includes at least one optical fiber 1902 provided in a geometric pattern as shown at 1904. The optical fiber 1902 may be fed at 1906. A consolidation roller 1908 may uniformly place the optical fiber 1902 onto the substrate 1900. A heating source 1910 may heat the substrate to a specified temperature to allow for embedding of the optical fiber 1902 into the substrate 1900. In this manner, various geometric patterns as disclosed herein may be formed with respect to the sensing membrane layout 122.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An optical fiber-based sensing membrane comprising:
a substrate; and
at least one optical fiber integrated in the substrate,
wherein the at least one optical fiber is placed on the substrate in a pattern that includes arbitrary paths and common paths, wherein the arbitrary paths are paths where the at least one optical fiber is arbitrarily placed on the substrate, and the common paths are paths where one end of the at least one optical fiber is looped back to join another part of the at least one optical fiber, and
wherein the common paths of the at least one optical fiber are evenly distributed over a total length of the at least one optical fiber to provide temperature measurements of a device.

2. The optical fiber-based sensing membrane according to claim 1, wherein the common paths are alternating with the arbitrary paths along the total length of the at least one optical fiber.

3. The optical fiber-based sensing membrane according to claim 1, wherein the device includes a battery pack of an electric vehicle.

4. The optical fiber-based sensing membrane according to claim 1, wherein the optical fiber-based sensing membrane includes a two-dimensional (2D) layout.

5. The optical fiber-based sensing membrane according to claim 1, wherein the optical fiber-based sensing membrane includes a three-dimensional (3D) layout.

6. The optical fiber-based sensing membrane according to claim 1, wherein the substrate includes Polyimide.

7. The optical fiber-based sensing membrane according to claim 1, wherein the at least one optical fiber and the substrate include a combined weight of between approximately 200 g/m2 to 500 g/m2.

8. The optical fiber-based sensing membrane according to claim 1, wherein the at least one optical fiber and the substrate include a combined thickness of less than approximately 0.5 mm.

9. The optical fiber-based sensing membrane according to claim 1, wherein each of the arbitrary paths of the at least one optical fiber includes a circular geometric pattern.

10. The optical fiber-based sensing membrane according to claim 1, wherein each of the arbitrary paths of the at least one optical fiber includes a spiral geometric pattern.

11. The optical fiber-based sensing membrane according to claim 1, wherein each of the arbitrary paths of the at least one optical fiber includes a grid geometric pattern.

12. The optical fiber-based sensing membrane according to claim 1, wherein each of the arbitrary paths of the at least one optical fiber includes a plurality of loops.

13. The optical fiber-based sensing membrane according to claim 1, wherein the at least one optical fiber is folded in half at an edge of the substrate.

14. A method for forming an optical fiber-based sensing membrane comprising:
- placing at least one optical fiber on a substrate in a pattern that includes arbitrary paths and common paths, wherein the arbitrary paths are paths where the at least one optical fiber is arbitrarily placed on the substrate, and the common paths are paths where one end of the at least one optical fiber is looped back to join another part of the at least one optical fiber, and wherein the common paths are to be evenly distributed over a total length of the at least one optical fiber;
- rolling a consolidation roller on the substrate to uniformly press the at least one optical fiber in the pattern onto the substrate; and
- heating the substrate to a predetermined temperature to integrate the at least one optical fiber in the pattern into the substrate.

15. The method according to claim 14, wherein the common paths are alternating with the arbitrary paths along the total length of the at least one optical fiber.

16. The method according to claim 14, wherein the at least one optical fiber is folded in half at an edge of the substrate.

17. A method comprising:
- embedding an optical fiber-based sensing membrane in a device, wherein the optical fiber-based sensing membrane includes a substrate and at least one optical fiber integrated in the substrate, wherein the at least one optical fiber is placed on the substrate in a pattern that includes arbitrary paths and common paths, wherein the arbitrary paths are paths where the at least one optical fiber is arbitrarily placed on the substrate, and the common paths are paths where one end of the at least one optical fiber is looped back to join another part of the at least one optical fiber, and wherein the common paths are evenly distributed over a total length of the at least one optical fiber; and
- ascertaining, via the optical fiber-based sensing membrane, a temperature of the device.

18. The method according to claim 17, wherein the device includes a battery pack of an electric vehicle.

19. The method according to claim 17, wherein the common paths are alternating with the arbitrary paths along the total length of the at least one optical fiber.

20. The method according to claim 17, further comprising:
- folding the at least one optical fiber in half at an edge of the substrate.

* * * * *